(12) United States Patent
Matsui

(10) Patent No.: US 7,995,284 B2
(45) Date of Patent: Aug. 9, 2011

(54) ZOOM LENS AND IMAGE PICKUP APPARATUS

(75) Inventor: Takumi Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/926,401

(22) Filed: Nov. 16, 2010

(65) Prior Publication Data

US 2011/0149119 A1 Jun. 23, 2011

(30) Foreign Application Priority Data

Dec. 18, 2009 (JP) ................. 2009-287977

(51) Int. Cl.
*G02B 15/14* (2006.01)
*G02B 27/64* (2006.01)
(52) U.S. Cl. ...................... 359/683; 359/557
(58) Field of Classification Search .......... 359/554, 359/557, 676, 683
See application file for complete search history.

(56) References Cited

U.S. PATENT DOCUMENTS

| 7,286,299 | B2 | 10/2007 | Matsui | |
|---|---|---|---|---|
| 7,426,085 | B2* | 9/2008 | Yoshitsugu et al. | 359/819 |
| 2008/0212201 | A1* | 9/2008 | Sato | 359/687 |
| 2009/0324207 | A1 | 12/2009 | Hatakeyama et al. | |
| 2010/0271710 | A1* | 10/2010 | Ohashi | 359/687 |
| 2010/0302650 | A1* | 12/2010 | Fujisaki | 359/686 |

FOREIGN PATENT DOCUMENTS

| JP | 2006-064839 | 3/2006 |
|---|---|---|
| JP | 2006-276475 | 10/2006 |

* cited by examiner

*Primary Examiner* — Scott J Sugarman
(74) *Attorney, Agent, or Firm* — Rader, Fishman & Grauer PLLC

(57) ABSTRACT

A zoom lens includes: a first lens group having a positive refracting power; a second lens group having a negative refracting power; a third lens group having a positive refracting power; a fourth lens group having a positive refracting power; and a fifth lens group having a positive or negative refracting power; the first, second, third, fourth and fifth lenses being disposed in order from the object side to the image side of the zoom lens.

7 Claims, 21 Drawing Sheets

ZOOM LENS AND IMAGE PICKUP APPARATUS

BACKGROUND OF THE INVENTION

1. Field of the Invention

This invention relates to a zoom lens and an image pickup apparatus. Specifically, the present invention relates to a technical field of a small-sized wide-angle zoom lens suitable for use with a small-sized image pickup apparatus such as a digital still camera and a video camera and also to an image pickup apparatus.

2. Description of the Related Art

Although an image pickup apparatus such as a digital still camera or a digital video camera has been miniaturized and become widespread for home use in recent years, further miniaturization is demanded for such image pickup apparatus. Accordingly, also for an image pickup lens incorporated in such image pickup apparatus, particularly also for a zoom lens, miniaturization by reduction of the overall length or the depth is demanded.

Particularly for a zoom lens for a digital still camera, also improvement in lens performance is demanded in addition to miniaturization in conformity with increase of the number of pixels of a solid-state image pickup device such as a CCD (Charge Coupled Device) device or a CMOS (Complementary Metal-Oxide Semiconductor) device.

Further, it is recently demanded strongly also to increase the power variation and the angle of view for image pickup at a wide angle end of a zoom lens.

A compact type digital still camera is available which incorporates a zoom lens whose power variation ratio is approximately 3 to 5 times. For a compact type digital still camera, it is demanded that it can be carried easily. Thus, it is necessary to reduce the thickness of an image pickup apparatus and a zoom lens in a thicknesswise direction, that is, in the direction of an optical axis from an image pickup object to the image pickup lens when the image pickup object stands facing the image pickup apparatus.

As a zoom lens suitable for reduction in thickness in the thicknesswise direction of an image pickup apparatus and the zoom lens, a zoom lens has been proposed which includes a bending optical system wherein an optical member for bending the optical axis by 90° is disposed in a first lens group. A zoom lens of the type just described is disclosed, for example, in Japanese Patent Laid-Open No. 2006-64839 (hereinafter referred to as Patent Document 1) or Japanese Patent Laid-Open No. 2006-276475 (hereinafter referred to as Patent Document 2).

The zoom lens disclosed in Patent Document 1 has a four-group configuration including a first lens group having a positive refracting power, a second lens group having a negative refracting power, a third lens group having a positive refracting power and a fourth lens group having a positive refracting power. In the zoom lens disclosed in Patent Document 1, a prism as the optical member for bending the optical axis by 90° is disposed between a negative lens and a positive lens of the first lens group to achieve reduction in thickness in the thicknesswise direction of the image pickup apparatus and the zoom lens.

The zoom lens disclosed in Patent Document 2 has a five-group configuration including a first lens group having a positive refracting power, a second lens group having a negative refracting power, a third lens group having a positive refracting power, a fourth lens group having a positive refracting power and a fifth lens group having a positive refracting power. The zoom lens disclosed in Patent Document 2 includes a camera shake correction mechanism which has a bending optical system and includes a positive lens disposed in a fifth lens group for shifting in a direction perpendicular to the optical axis to correct an image against a shake.

SUMMARY OF THE INVENTION

Incidentally, if it is tried to produce a zoom lens having a bending optical system so as to have a wider angle of view, then since the diameter of a flux of light passing through the first lens group increases due to the increased angle of view, the diameter or the thickness on the optical axis of the lenses of the first lens group increases. This makes an obstacle to reduction in thickness in the thicknesswise direction of the image pickup apparatus and the zoom lens.

However, if it is tried to increase the angle of view without increasing the diameter or the thickness on the optical axis of the lenses of the first lens group, then it is necessary to increase the refracting power of the lenses of the first lens group. This gives rise to a problem that the optical performance is deteriorated.

For example, in the case of the zoom lens disclosed in Patent Document 1, the angle of view is approximately 60° and is not widened. However, if it is intended to increase the angle of view with such a configuration of the zoom lens as described above, since the angle of view increases, the diameter of that one of the lenses of the first lens group which is positioned most on the object side. This gives rise to increase of the image pickup apparatus and the zoom lens in the thicknesswise direction.

Further, since no lens group is disposed in the proximity of the image surface, it is difficult to correct the magnification chromatic aberration and the curvature of field which increases as the angle of view increases and the off-axis optical performance is deteriorated.

Meanwhile, in the zoom lens disclosed in Patent Document 2, while it has a five-group configuration, since the amount of movement of the second lens group upon zooming is great, the distance from the first lens to the aperture is great. Therefore, if it is intended to achieve a wider angle of view, then the lens diameter and/or the thickness on the optical axis of the first lens group increase. Therefore, reduction in thickness in the thicknesswise direction of the image pickup apparatus and the zoom lens is difficult.

Therefore, it is desirable to achieve miniaturization and increase of the angle of view of a zoom lens and an image pickup apparatus which have a bending optical system.

According to an embodiment of the present invention, there is provided a zoom lens including a first lens group having a positive refracting power, a second lens group having a negative refracting power, a third lens group having a positive refracting power, a fourth lens group having a positive refracting power, and a fifth lens group having a positive or negative refracting power, the first, second, third, fourth and fifth lenses being disposed in order from the object side to the image side of the zoom lens. The second lens group and the fourth lens group are moved in the direction of an optical axis upon zooming. The first lens group has a position fixed in the direction of the optical axis upon zooming. The first lens group includes a front side lens having a negative refracting power, an optical member for bending an optical path and a rear side lens having a positive refracting power, disposed in order from the object side toward the image side. The third lens group has a position fixed in the direction of the optical axis upon zooming. The zoom lens further includes an aperture disposed between the second lens group and the third lens group or between the third lens group and the fourth lens group. The zoom lens satisfies the following conditional expressions (1), (2) and (3):

$$1.8 < F1/FW < 3.0 \quad (1)$$

$$2.0 < D1G/FW < 3.3 \quad (2)$$

$$2.0 < DIA11/DIA21 < 3.0 \quad (3)$$

where
F1: focal length of the first lens group
D1G: thickness of the first lens group on the optical axis
FW: focal length of the entire lens system at the wide angle end
DIA11: effective diameter of the lens surface on the most object side of the first lens at the wide angle end
DIA21: effective diameter of the lens surface on the most object side of the second lens at the wide angle end.

With the zoom lens, the directions of movement of the second lens group and the fourth lens group when zooming is carried out coincide with the direction of the optical axis of the rear side lens of the first lens group, that is, with the direction of the optical path after bent by the optical member. Further, the aperture or iris is disposed in the proximity of the center of the five-group zoom configuration.

Preferably, the zoom lens satisfies the following conditional expressions (4) and (5):

$$2.1 < |FG1/FW| < 3.3 \quad (4)$$

$$1.8 < |FRW/FW| < 2.4 \quad (5)$$

where
FG1: focal length of the front side lens of the first lens group
FRW: focal length from the rear side lens of the first lens group to the fifth lens group at the wide angle end.

Where the zoom lens satisfies the conditional expressions (4) and (5), the refracting power of the front side lens of the first lens group is normalized. Consequently, appearance of the magnification chromatic aberration at the wide angle end is suppressed and the effective diameter of the front side lens and the optical member becomes small.

Preferably, the second lens group includes a negative lens and a cemented lens of a negative lens and a positive lens disposed in order from the object side toward the image side, and the fourth lens group includes a cemented lens of a positive lens and a negative lens disposed in order from the object side toward the image side, the zoom lens satisfying the following conditional expression (6):

$$0.84 < |D4/D21 < 2.0 \quad (6)$$

where
D2: amount of movement of the second lens group upon zooming where the image pickup object is located at infinity
D4: amount of movement of the fourth lens group upon zooming where the image pickup object is located at infinity.

Where the zoom lens is configured in such a manner as described above and satisfies the conditional expression (6), the thickness of the second lens group on the optical axis decreases and the amount of movement of the second lens group and the fourth lens group upon zooming is normalized.

Preferably, the zoom lens satisfies the following conditional expressions (7) and (8):

$$0.5 < |F2/FW| < 1.0 \quad (7)$$

$$2.0 < F4/FW < 3.0 \quad (8)$$

where
F2: focal length of the second lens group
F4: focal length of the fourth lens group.

Where the zoom lens satisfies the conditional expressions (7) and (8), the refracting power of the second lens group and the fourth lens group is normalized, and the amount of movement of the second lens group and the fourth lens group upon zooming is reduced.

Preferably, the fifth lens group has a positive refracting power and is configured such that a negative lens, a first positive lens movable in a direction perpendicular to the optical axis to shift an image, and a second positive lens having at least one face formed as an aspheric face are disposed in order from the object side toward the image side, the fifth lens group satisfying the following conditional expressions (9), (10) and (11):

$$0.15 < \beta 52 < 0.55 \quad (9)$$

$$0.6 < \beta 53 < 1.1 \quad (10)$$

$$-0.2 < FW/F5 < 0.2 \quad (11)$$

where
β52: lateral magnification of the first positive lens at the wide angle end
β53: lateral magnification of the second positive lens at the wide angle end
F5: focal length of the fifth lens group.

Where the zoom lens satisfies the conditional expressions (9), (10) and (11), the variation of the curvature of field when the first positive lens is shifted is suppressed, and the refracting power of the fifth lens group is normalized.

In this instance, preferably the first positive lens of the fifth lens group is formed from resin and has at least one face formed as an aspheric face.

Where the first positive lens of the fifth lens group is formed from resin and has at least one face formed as an aspheric face, the first positive lens is reduced in weight and appearance of aberrations is suppressed.

According to another embodiment of the present invention, there is provide an image pickup apparatus including a zoom lens, and an image pickup element for converting an optical image formed by the zoom lens into an electric signal, the zoom lens including a first lens group having a positive refracting power, a second lens group having a negative refracting power, a third lens group having a positive refracting power, a fourth lens group having a positive refracting power, and a fifth lens group having a positive or negative refracting power, the first, second, third, fourth and fifth lenses being disposed in order from the object side to the image side of the zoom lens, the second lens group and the fourth lens group being moved in the direction of an optical axis upon zooming, the first lens group having a position fixed in the direction of the optical axis upon zooming, the first lens group including a front side lens having a negative refracting power, an optical member for bending an optical path and a rear side lens having a positive refracting power, disposed in order from the object side toward the image side, the third lens group having a position fixed in the direction of the optical axis upon zooming, the zoom lens further including an aperture disposed between the second lens group and the third lens group or between the third lens group and the fourth lens group. The zoom lens satisfies the following conditional expressions (1), (2) and (3):

$$1.8 < F1/FW < 3.0 \quad (1)$$

$$2.0 < D1G/FW < 3.3 \quad (2)$$

$$2.0 < D1A11/DIA21 < 3.0 \quad (3)$$

where

F1: focal length of the first lens group
D1G: thickness of the first lens group on the optical axis
FW: focal length of the entire lens system at the wide angle end
effective diameter of the lens surface on the most object side of the first lens at the wide angle end
DIA21: effective diameter of the lens surface on the most object side of the second lens at the wide angle end.

With the image pickup apparatus, the directions of movement of the second lens group and the fourth lens group when zooming is carried out coincide with the direction of the optical axis of the rear side lens of the first lens group, that is, the direction of the optical path after bent by the optical member. Further, the aperture or iris is disposed in the proximity of the center of the five-group zoom configuration.

With the zoom lens and the image pickup apparatus, reduction in weight and increase of the angle of view of a lens system having a bending optical system can be achieved.

DETAILED DESCRIPTION OF THE PREFERRED EMBODIMENTS

Figure 1:
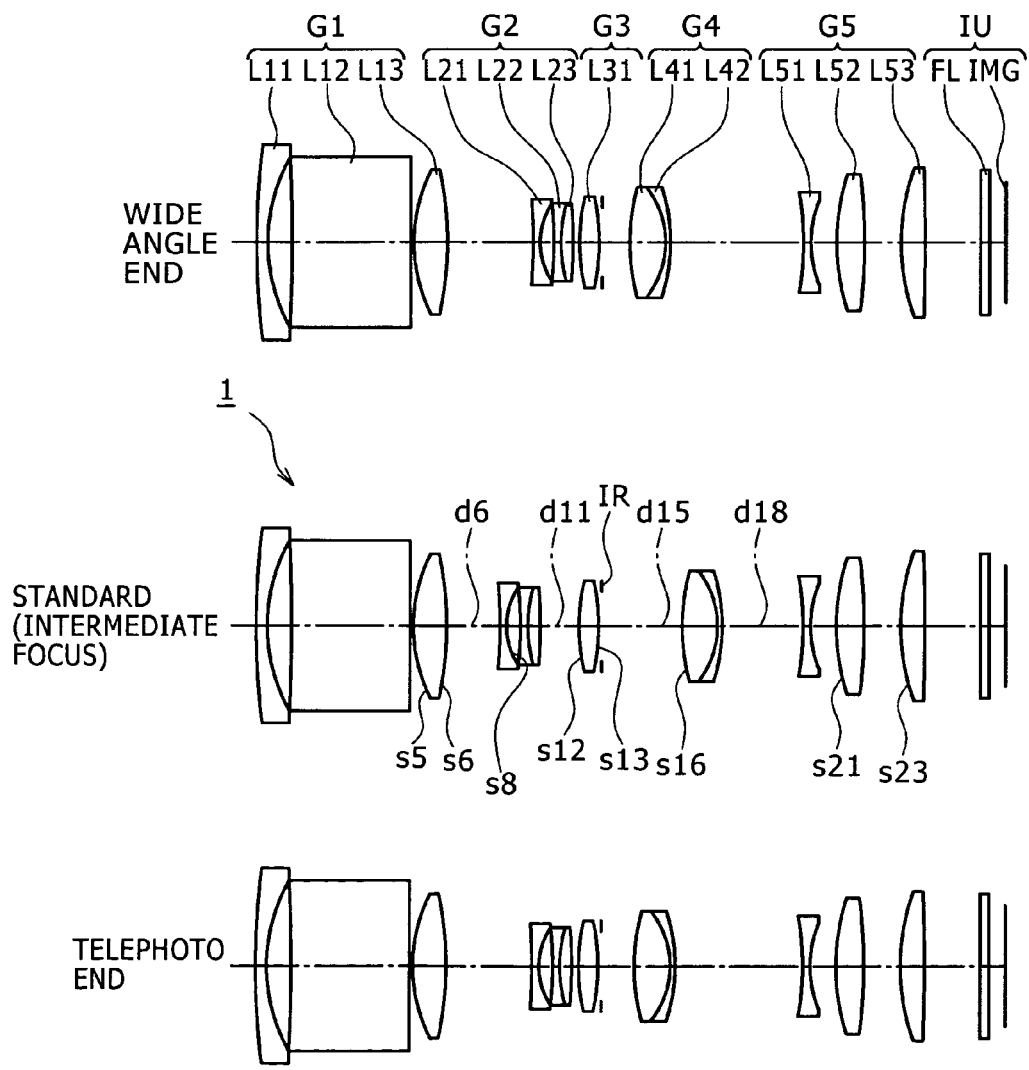
FIG. 1 is a schematic view showing a lens configuration of a zoom lens according to a first embodiment of the present invention.

In the following, preferred embodiments of the present invention wherein the present invention is applied to a zoom lens and an image pickup apparatus are described.

Configuration of the Zoom Lens

The zoom lens according to an embodiment of the present invention includes a first lens group having a positive refracting power, a second lens group having a negative refracting power, a third lens group having a positive refracting power, a fourth lens group having a positive refracting power, and a fifth lens group having a positive or negative refracting power, disposed in order from the object side to the image side.

In the zoom lens, the second lens group and the fourth lens group are moved in the direction of an optical axis upon zooming.

In the zoom lens, the first lens group has a position fixed in the direction of the optical axis upon zooming. In the first lens group, a front side lens having a negative refracting power, an optical member for bending an optical path and a rear side lens having a positive refracting power are disposed in order from the object side to the image side.

In addition, in the zoom lens, the third lens group has a position fixed in the direction of the optical axis upon zooming, and the aperture is disposed between the second lens group and the third lens group or between the third lens group and the fourth lens group. The zoom lens satisfies the following conditional expressions (1), (2) and (3):

$$1.8 < F1/FW < 3.0 \quad (1)$$

$$2.0 < D1G/FW < 3.3 \quad (2)$$

$$2.0 < DIA11/DIA21 < 3.0 \quad (3)$$

where
F1: focal length of the first lens group
D1G: thickness of the first lens group on the optical axis
FW: focal length of the entire lens system at the wide angle end
DIA11: effective diameter of the lens surface on the most object side of the first lens at the wide angle end
DIA21: effective diameter of the lens surface on the most object side of the second lens at the wide angle end.

Since the zoom lens is configured in such a manner as described above, the following advantages can be achieved.

The directions of movement of the second lens group and the fourth lens group when zooming is carried out coincide with the direction of the optical axis of the rear side lens of the first lens group, that is, the direction of the optical path after it is bent by the optical member. Consequently, reduction of the thickness of the lens system can be achieved.

Further, since the aperture is disposed between the second lens group and the third lens group or between the third lens group and the fourth lens group, the aperture can be disposed in the proximity of the center of the five-group zoom configuration. Consequently, the effective diameter of the zoom lens from the first lens group to the fifth lens group can be reduced and reduction of the thickness of the lens system can be anticipated.

The conditional expression (1) defines the focal length of the first lens group. By appropriately defining the focal length of the first lens group, a zoom lens of a small size which is less likely to suffer from appearance of the off-axis aberration at the wide angle end can be implemented while it is a wide angle zoom lens.

If the focal length of the first lens group becomes smaller than the lower limit of the conditional expression (1), then since it is excessively small, the refracting power of the rear side lens of the first lens group becomes excessively high. Consequently, the magnification chromatic aberration increases at the wide angle end side while the on-axis chromatic aberration increases on the telephoto end side. Further, where the front side lens and the rear side lens have fixed refracting powers, the distance between the front side lens and the rear side lens on the optical axis increases, resulting in difficulty in reduction of the thickness of the optical system.

On the contrary, if the focal length of the first lens group becomes greater than the upper limit of the conditional expression (1), then since the focal length of the first lens group becomes excessively great, it becomes necessary to assure a great amount of movement of the second lens group for magnification, resulting in increase of the distance between the first lens group and the third lens group. Further, if the distance from the front side lens of the first lens group to the aperture increases, then the entrance pupil position is spaced away from the front side lens toward the image side. Therefore, if the angle of view is increased, then the diameter of the front side lens and the optical member becomes great, and this makes an obstacle to reduction in thickness.

The conditional expression (2) defines the thickness of the first lens group, which includes the optical member for bending the optical axis, on the optical axis. If the focal length of the first lens group satisfies the conditional expression (1) and the thickness of the first lens group on the optical axis is defined suitably so as to satisfy the conditional expression (2), then reduction in size and thickness can be anticipated while the zoom lens is of the wide angle type.

If the thickness of the first lens group becomes smaller than the lower limit of the conditional expression (2), since the distance between the front side lens and the rear side lens becomes excessively small, it is difficult to assure a sufficient length for bending the optical path of the optical member. Further, the refracting power of the front side lens or the rear side lens becomes excessively high, and consequently, the magnification chromatic aberration increases at the wide angle end side while the on-axis chromatic aberration increases on the telephoto end side.

On the contrary, if the thickness of the first lens group is greater than the upper limit of the conditional expression (2), then the refracting power of the front side lens becomes excessively low, and consequently, the diameter and the thickness on the optical axis of the front side lens and the optical member become great. Consequently, the thickness of the image pickup apparatus and the zoom lens when the optical path is bent increases, and this makes an obstacle to reduction in thickness.

The conditional expression (3) defines the ratio between the effective diameter of the lens face on the most object side of the first lens group and the effective diameter of the lens face on the most object side of the second lens group. If the ratio between the effective diameter of the lens face on the most object side of the first lens group and the effective diameter of the lens face on the most object side of the second lens group is defined appropriately, then the first lens group can be reduced in size and thickness while the zoom lens is of the wide angle type.

If the ratio between the effective diameters becomes lower than the lower limit of the conditional expression (3), then the effective diameter of the second lens group becomes excessively great, and a light path of a light ray at a maximum angle of view in the second lens group passes a portion spaced far away from the optical axis. Therefore, the thickness of the second lens group on the optical axis becomes great, and it is impossible to sufficiently assure an amount of movement of the second lens group upon zooming. Further, if a light path of a light ray at the maximum angle of view in the second lens group passes a portion spaced away from the optical axis, then the magnification chromatic aberration and the out-axis aberration such as the curvature of field increase. In addition, since also the variation of the aberrations upon zooming becomes great, it becomes difficult to correct the aberrations.

On the contrary, if the ratio between the effective diameter of the lens face on the most object side of the first lens group and the effective diameter of the lens face on the most object side of the second lens group becomes higher than the upper limit of the conditional expression (3), then the effective diameter of the front side lens of the first lens group becomes excessively great and also the effective diameter of the optical member becomes excessively great. Therefore, the thickness of the image pickup apparatus and the zoom lens when the light path is bent increases, resulting in failure to achieve reduction in thickness.

It is to be noted that the conditional expression (1) is modified more preferably such that the lower limit is 2.1 and the upper limit is 2.7. The conditional expression (2) is modified more preferably such that the lower limit is 2.2 and the upper limit is 2.9. The conditional expression (3) is modified more preferably such that the lower limit is 2.1 and the upper limit is 2.6.

Where the conditional expressions (1), (2) and (3) are modified as described above, the advantages described above are enhanced.

Further, where the zoom lens is configured in such a manner as described above, it is possible to set the angle of view of image pickup at the wide angle end to approximately 70° to 95° and set the magnification ratio to approximately 3 to 6 times.

Preferably, the zoom lens satisfies the following conditional expressions (4) and (5):

$$2.1<|FG1/FW|<3.3 \qquad (4)$$

$$1.8<|FRW/FW|<2.4 \qquad (5)$$

where
FG1: focal length of the front side lens of the first lens group
FRW: focal length from the rear side lens of the first lens group to the fifth lens group at the wide angle end.

The conditional expression (4) defines the focal length of the front side lens of the first lens group. If the focal length of the front side lens of the first lens group is set appropriately, then a zoom lens of a small size which is less likely to suffer from appearance of the off-axis aberration at the wide angle end can be implemented while it is a wide angle zoom lens.

If the focal length of the front side lens of the first lens group becomes shorter than the lower limit of the conditional expression (4), then the refracting power of the front side lens becomes excessively high, and the magnification chromatic aberration at the wide angle end which is generated by the front side lens increases. Further, since the lateral magnification at the wide angle end of the lens system of the combination from the second lens group to the fifth lens group becomes high, it becomes difficult to assure a magnification ratio of approximately to 3 to 6 times.

On the contrary, if the focal length of the front side lens of the first lens group becomes higher than the upper limit of the conditional expression (4), then the refracting power of the front side lens becomes excessively low, and the effective diameter of the front side lens and the optical member becomes great. Consequently, the thickness of the image pickup apparatus and the zoom lens when the light path is bent increases, resulting in failure to achieve reduction in thickness.

The conditional expression (5) defines the focal length from the rear side lens of the first lens group to the fifth lens group at the wide angle end. If the focal length from the rear side lens of the first lens group to the fifth lens group, that is, the combined focal length, at the wide angle end is set appropriately, then a zoom lens of a small size which is less likely to suffer from appearance of the off-axis aberration at the wide angle end can be implemented while it is a wide angle zoom lens.

If the focal length from the rear side lens of the first lens group to the fifth lens group at the wide angle end becomes lower than the lower limit of the conditional expression (5), then the refracting power of the front side length becomes excessively low, and the effective diameter of the optical member becomes great. Therefore, the thickness of the image pickup apparatus and the zoom lens when the light path is bent increases, resulting in failure to achieve reduction in thickness.

On the contrary, if the focal length from the rear side lens of the first lens group to the fifth lens group at the wide angle end becomes higher than the upper limit of the conditional expression (5), then it becomes excessively great, and this increases the overall length of the optical system.

It is to be noted that the conditional expression (4) is modified more preferably such that the lower limit is set to 2.4 and the upper limit is set to 3.1. Meanwhile, the conditional expression (5) is modified more preferably such that the lower limit is set to 1.8 and the upper limit is set to 2.2.

Where the expressions (4) and (5) are modified in such a manner as just described, the advantages described above are enhanced.

In the zoom lens described above, the second lens group includes a negative lens and a cemented lens of a negative lens and a positive lens disposed in order from the object side toward the image side, and the fourth lens group includes a cemented lens of a positive lens and a negative lens disposed in order from the object side toward the image side. Preferably, the following conditional expression (6) is satisfied.

$$0.84<|D4/D2|<2.0 \qquad (6)$$

where
D2: amount of movement of the second lens group upon zooming where the image pickup object is located at infinity
D4: amount of movement of the fourth lens group upon zooming where the image pickup object is located at infinity.

Where the second lens group is configured in such a manner as described above, the second lens group on the optical axis can be made thin in thickness, and consequently, the distance between the first lens group and the third lens group can be made small and the effective diameter of the first lens group can be made small. Further, since the second lens group and the fourth lens group can be made thin in thickness on the optical axis, the amount of movement of the second lens group and the fourth lens group upon zooming can be increased, and a high magnification ratio can be obtained readily.

The conditional expression (6) defines the ratio between the amount of movement of the second lens group and the amount of movement of the fourth lens group upon zooming. If the ratio between the amount of movement of the second lens group and the amount of movement of the fourth lens group upon zooming is defined appropriately, a zoom lens of a small size which can assure a desired magnification ratio of approximately 3 to 6 times can be implemented while it is a wide angle zoom lens.

If the ratio between the amount of movement of the second lens group and the amount of movement of the fourth lens group upon zooming becomes lower than the lower limit of the conditional expression (6), then the amount of movement of the second lens group upon zooming increases to increase the distance between the front side lens and the aperture. Therefore, the effective diameter of the front side lens increases and also the effective diameter of the optical member becomes great. Consequently, the thickness of the image pickup apparatus and the zoom lens when the light path is bent increases, resulting in failure to achieve reduction in thickness.

On the contrary, if the ratio between the amount of movement of the second lens group and the amount of movement of the fourth lens group upon zooming becomes higher than the upper limit of the conditional expression (6), then the amount of movement of the fourth lens group increases and the distance between the aperture and the fourth lens group increases. Consequently, the effective diameter of the fourth lens group increases, resulting in increase of the size of the image pickup apparatus and the zoom lens in the thickness-wise direction.

It is to be noted that the conditional expression (6) is modified more preferably such that the lower limit is set to 1.05 and the upper limit is set to 1.5.

Where the conditional expression (6) is modified as just described, then the advantages described above are enhanced.

Preferably, the zoom lens described above satisfies the following conditional expressions (7) and (8):

$$0.5 < |F2/FW| < 1.0 \qquad (7)$$

$$2.0 < F4/FW < 3.0 \qquad (8)$$

where
F2: focal length of the second lens group
F4: focal length of the fourth lens group.

The conditional expression (7) defines the focal length of the second lens group. If the focal length of the second lens group is defined appropriately, then a zoom lens of a small size which can assure a desired magnification ratio of approximately 3 to 6 times can be implemented while it is a wide angle zoom lens.

If the focal length of the second lens group becomes lower than the lower limit of the conditional expression (7), then since the refracting power of the second lens group becomes excessively high, the amount of appearance of aberrations in the second lens group increases.

On the contrary, if the focal length of the second lens group becomes higher than the upper limit of the conditional expression (7), then the amount of movement of the second lens group increases in order to obtain a desired magnification ratio and consequently the distance between the front side lens and the aperture increases. Therefore, the effective diameter of the front side lens increases and the effective diameter of the optical member increases, and the thickness of the image pickup apparatus and the zoom lens when the light path is bent increases, resulting in failure to achieve reduction in thickness.

The conditional expression (8) defines the focal length of the fourth lens group. If the focal length of the fourth lens group is defined suitably, then a zoom lens of a small size which can assure a desired magnification ratio can be implemented while it is a wide angle zoom lens.

If the focal length of the fourth lens group becomes lower than the conditional expression (8), then since the refracting power of the fourth lens group becomes excessively high, the spherical aberration and the comatic aberration increase over the overall range of the zooming.

On the contrary, if the focal length of the fourth lens group becomes higher than the upper limit of the conditional expression (8), then the amount of movement of the fourth lens group for obtaining a desired magnification ratio increases to increase the distance between the aperture and the fourth lens group. Therefore, the effective diameter of the fourth lens group increases, resulting in increase of the size of the image pickup apparatus and the zoom lens in the thicknesswise direction.

It is to be noted that the conditional expression (7) is modified more preferably such that the lower limit is set to 0.6 and the upper limit is set to 1.0. The conditional expression (8) is modified more preferably such that the lower limit is set to 2.15 and the upper limit is set to 2.6.

If the conditional expressions (7) and (8) are modified as just described, then the advantages described above are enhanced.

In the zoom lens, the fifth lens group has a positive refracting power and is configured such that a negative lens, a first positive lens movable in a direction perpendicular to the optical axis to shift an image, and a second positive lens having at least one face formed as an aspheric face are disposed in order from the object side toward the image side.

Preferably, the fifth lens group satisfies the following conditional expressions (9), (10) and (11):

$$0.15 < \beta 52 < 0.55 \qquad (9)$$

$$0.6 < \beta 53 < 1.1 \qquad (10)$$

$$-0.2 < FW/F5 < 0.2 \qquad (11)$$

where
$\beta 52$: lateral magnification of the first positive lens at the wide angle end
$\beta 53$: lateral magnification of the second positive lens at the wide angle end
F5: focal length of the fifth lens group.

Where the fifth lens group is configured in such a manner as described above, movement of an image caused by a camera shake or the like upon image pickup is cancelled, and besides the variation of the curvature of field when the first positive lens is shifted can be suppressed.

The conditional expression (9) defines the lateral magnification of the first positive lens at the wide angle end, and the conditional expression (10) defines the lateral magnification of the second positive lens at the wide angle end.

If the lateral magnifications of the first and second positive lenses at the wide angle end are defined appropriately, then the ratio between the amount of shift movement of the first positive lens and amount of movement of an image on the image surface (the ratio is hereinafter referred to as "image movement sensitivity") can be set to an appropriate value. Besides, a good effect of the aberration correction at the lenses can be assured.

If the lateral magnification of the first positive lens at the wide angle end becomes lower than the lower limit of the conditional expression (9) or if the lateral magnification of the second positive lens at the wide angle end becomes higher than the upper limit of the conditional expression (10), then the image movement sensitivity becomes excessively high. Therefore, control for correcting the image shake appropriately becomes difficult.

On the contrary, if the lateral magnification of the first positive lens at the wide angle end becomes higher than the upper limit of the conditional expression (9) or if the lateral magnification of the second positive lens at the wide angle end becomes lower than the lower limit of the conditional expression (10), then the image movement sensitivity becomes excessively low. Consequently, the shift movement amount of the first positive lens for correcting the image shake appropriately becomes excessively great, and this increases the size of the image pickup apparatus and the zoom lens in the thicknesswise direction.

The conditional expression (11) defines the focal length of the fifth lens group and particularly defines the range of a condition for achieving miniaturization of the entire zoom lens of the five group configuration. As described hereinabove, it is necessary for the first positive lens to have an appropriate image movement sensitivity defined by the conditional expressions (9) and (10). Thus, by assuring an image movement sensitivity optimum for image shake correction and defining the focal length of the fifth lens group appropriately, miniaturization of the entire zoom lens can be anticipated.

If the focal length of the fifth lens group becomes lower than the lower limit of the conditional expression (11), then the negative refracting power of the fifth lens group becomes excessively high and the positive refracting power from the first lens group to the fourth lens group becomes excessively high. Therefore, the aberrations generated by the first lens group to the fourth lens group increase. Further, the aberrations caused by the first lens group to the fourth lens group are expanded by the fifth lens group, and this gives rise to significant deterioration of optical performances.

On the contrary, if the focal length of the fifth lens group becomes higher than the upper limit of the conditional expression (11), then the positive refracting power of the fifth lens group becomes excessively high and the focal length from the first lens group to the fourth lens group becomes long. This gives rise to increase of the overall length of the zoom lens.

It is to be noted that the conditional expression (9) is modified more preferably such that the lower limit is set to 0.2 and the upper limit is set to 0.5. Meanwhile, the conditional expression (10) is modified more preferably such that the lower limit is set to 0.7 and the upper limit is set to 1.1. Further, the conditional expression (11) is modified more preferably such that the lower limit is set to −0.05 and the upper limit is set to 0.05.

Where the conditional expressions (9), (10) and (11) are modified as described above, the advantages described above are enhanced.

In the zoom lens, preferably the first positive lens of the fifth lens group is formed from resin and has at least one face formed as an aspheric face.

By forming the first positive lens of the fifth lens group from resin, reduction of the cost can be anticipated and reduction of the weight makes it easy to move the first positive lens in a direction perpendicular to the optical axis. Further, although it is known with regard to a zoom lens of such a bending optical system as in the embodiment of the present invention that reduction in size of the image pickup apparatus and the zoom lens in the thicknesswise direction can be anticipated by cutting an end or outer circumferential portion of a lens, it is possible to form the first positive lens by injection molding such that it has a shape having no end formed thereon. Consequently, the cutting step can be omitted, and reduction of the production cost can be achieved.

Numerical Value Examples of the Zoom Lens

In the following, zoom lenses according to particular embodiments of the present invention and numerical value examples applied to the embodiments are described with reference to the accompanying drawings and tables.

It is to be noted that characters used in the tables and the following descriptions are such as follows:

"si" represents the ith face as counted from the object side toward the image side; "ri" the radius of curvature of the ith face; "di" the face distance on the axis between the ith face and the i+1th face; "ni" the refractive index of a lens beginning with the ith face or the like with regard to the d-line ($\lambda$=587.6 nm), "vi" the Abbe number of a lens beginning with the ith face or the like with regard to the d-line; and "DIAi" the effective radius of the ith face. Further, "F" represents the focal length of the entire lens system; "Fno" the F number (open F value); and "ω" a half angle of view. In regard to the radius "ri" of curvature, "∞" represents that the face is a flat face. Further, "K" represents a conic constant, and "A4," "A6," "A8" and "A10" represent fourth, sixth, eighth and tenth-order aspheric coefficients, respectively.

It is to be noted that, in the tables given below which indicate an aspheric coefficient, "E-i" is an exponential expression wherein the base is 10, that is, "$10^{-i}$," and for example, "0.12345E-05" represents "$0.12345 \times 10^{-5}$."

The lenses used in the numerical value examples include some lenses having an aspheric lens face. The aspheric face is defined by the following expression 1:

$$Z = \frac{C \cdot H^2}{1 + \{1 - (1+K)C^2 \cdot H^2\}^{1/2}} + \Sigma(Ai \cdot Hi)$$

where "Z" is the distance in the direction of the optical axis at the height "H" ($=\sqrt{(X^2+Y^2)}$) from the optical axis of the tangential plane and the spherical face at the apex of the aspheric face, and "C" is the radius of curvature (1/r) at the apex of the aspheric face.

Zoom lenses 1, 2, 3, 4 and 5 of embodiments described below have a five-group configuration of a first lens group G1 to a fifth lens group G5.

An image pickup element unit IU is disposed on the image side of the fifth lens group. The image pickup element unit IU is configured from an image pickup element having an image pickup face IMG and a filter FL. For the image pickup element, for example, a CCD device, a CMOS device or the like is used, and the filter FL is configured, for example, from an infrared cutting filter or a low-pass filter.

First Embodiment

FIG. 1 shows a lens configuration of a zoom lens 1 according to a first embodiment of the present invention.

Referring to FIG. 1, the zoom lens 1 shown has a magnification ratio of 3.73 times.

The zoom lens 1 includes a first lens group G1 having a positive refracting power, a second lens group G2 having a negative refracting power, a third lens group G3 having a positive refracting power, a fourth lens group G4 having a positive refracting power, and a fifth lens group G5 having a positive refracting power. The first lens group G1, second lens group G2, third lens group G3, fourth lens group G4 and fifth lens group G5 are disposed in order from the object side toward the image side.

The first lens group G1 includes a first lens or front side lens L11 having a negative refracting power, a prism L12 serving as an optical member for bending the optical axis by 90°, and a third lens or rear side lens L13 having a positive refracting power. The first lens L11, prism L12 and third lens L13 are disposed in order from the object side toward the image side.

The first lens group G1 has a position fixed in the direction of the optical axis upon zooming. The prism L12 is disposed in the first lens group G1 to bend the optical axis by 90°. Consequently, reduction in thickness of the image pickup apparatus and the zoom lens in the thicknesswise direction can be anticipated.

The second lens group G2 includes a fourth lens L21 having a negative refracting power and a cemented lens including a fifth lens L22 having a negative refracting power and a sixth lens L23 having a positive refracting power and cemented to the fifth lens L22. The fourth lens L21 and the fifth lens L22 are disposed in order from the object side toward the image side.

The second lens group G2 is moved from the object side toward the image side upon zooming from the wide angle end toward the telephoto end.

The fourth lens L21 of the second lens group G2 is a concavo-concave lens whose face on the image side has an aspheric shape. Since the fourth lens L21 is formed as a concavo-concave lens whose face on the image side has an aspheric shape, the magnification chromatic aberration in a wide angle range and the comatic aberration in a telephoto range can be corrected efficiently.

The third lens group G3 includes a seventh lens L31 having a positive refracting power.

The third lens group G3 has a position fixed in the direction of the optical axis upon zooming.

The fourth lens group G4 includes a cemented lens including an eighth lens L41 having a positive refracting power and a ninth lens L42 having a negative refracting power and cemented to the eighth lens L41.

The fourth lens group G4 is moved from the image side toward the object side upon zooming from the wide angle end toward the telephoto end and is movable along the optical direction also upon focusing.

The fifth lens group G5 includes a tenth lens L51 having a negative refracting power, an eleventh lens or first positive lens L52 having a positive refracting power and movable in a direction perpendicular to the optical axis to shift an image, and a twelfth lens or second positive lens L53 having a positive refracting power. The tenth lens L51, eleventh lens L52 and twelfth lens L53 are disposed in order from the object side toward the image side.

The tenth lens L51 of the fifth lens group G5 is formed as a concavo-concave lens. Since the tenth lens L51 is formed as a concavo-concave lens, appearance of the magnification chromatic aberration in the wide angle range can be suppressed.

The eleventh lens L52 and the twelfth lens L53 of the fifth lens group G5 have an aspheric face. Since the eleventh lens L52 and the twelfth lens L53 have an aspheric face, the curvature of field in the wide angle region can be corrected effectively and the variation of the aberrations when the eleventh lens L52 moves in a direction perpendicular to the optical axis can be suppressed.

Both of the eleventh lens L52 and the twelfth lens L53 of the fifth lens group G5 are formed from a resin material. Since the eleventh lens L52 and the twelfth lens L53 are formed from a resin material, reduction of the cost can be achieved. Further, since the eleventh lens L52 is formed from a resin material, movement of the eleventh lens L52 in the direction perpendicular to the optical axis can be facilitated by reduction of the weight.

The aperture IR is disposed in the proximity of and on the image side of the third lens group G3.

Lens data of the numerical value example 1 where particular numerical values are applied to the zoom lens 1 of the first embodiment are indicated in Table 1 together with the F number Fno and a half angle Ω of view in a wide angle end state (F=5.18), an intermediate focal length state (F=9.99) and a telephoto end state (F=19.30).

TABLE 1

F = 5.18~9.99~19.30
Fno = 3.6~3.8~4.6
ω = 38.7°~21.3°~11.4°

| si | | ri | di | ni | vi | DIAi |
|---|---|---|---|---|---|---|
| 1 | | 45.316 | 0.75 | 1.9229 | 20.8 | 5.63 |
| 2 | | 10.848 | 1.65 | | | 4.96 |
| 3 | (Prism) | ∞ | 7.60 | 1.9037 | 31.3 | 4.88 |
| 4 | | ∞ | 0.25 | | | 4.20 |
| 5 | Aspheric | 9.158 | 2.10 | 1.6935 | 53.2 | 4.00 |
| 6 | Aspheric | −19.801 | d6 | | | 4.00 |
| 7 | | −21.732 | 0.42 | 1.8513 | 40.1 | 2.33 |
| 8 | Aspheric | 5.380 | 0.91 | | | 2.04 |
| 9 | | −8.768 | 0.40 | 1.8830 | 40.8 | 1.95 |
| 10 | | 7.460 | 0.85 | 1.9229 | 20.8 | 2.08 |
| 11 | | −37.288 | d11 | | | 2.15 |
| 12 | Aspheric | 11.543 | 1.35 | 1.6226 | 58.1 | 2.45 |
| 13 | Aspheric | −13.248 | 0.20 | | | 2.42 |

TABLE 1-continued

F = 5.18~9.99~19.30
Fno = 3.6~3.8~4.6
ω = 38.7°~21.3°~11.4°

| si | | ri | di | ni | vi | DIAi |
|---|---|---|---|---|---|---|
| 14 | (Aperture) | ∞ | 1.50 | | | 2.35 |
| 15 | | ∞ | d15 | | | 2.68 |
| 16 | Aspheric | 13.000 | 2.30 | 1.6226 | 58.1 | 3.00 |
| 17 | | −5.731 | 0.40 | 1.7618 | 26.6 | 2.96 |
| 18 | | −11.441 | d18 | | | 2.95 |
| 19 | | −26.872 | 0.42 | 2.0006 | 25.45 | 2.75 |
| 20 | | 9.617 | 1.60 | | | 2.76 |
| 21 | Aspheric | 11.339 | 1.90 | 1.5250 | 56.5 | 3.69 |
| 22 | | −35.250 | 2.35 | | | 3.83 |
| 23 | Aspheric | 13.192 | 1.63 | 1.5250 | 56.5 | 4.14 |
| 24 | | −124.104 | 3.74 | | | 4.15 |
| 25 | | ∞ | 0.50 | 1.5567 | 58.5 | 4.10 |
| 26 | | ∞ | 1.00 | | | 4.10 |

Upon zooming between the wide angle end state and the telephoto end state of the zoom lens 1, the face distance d6 between the first lens group G1 and the second lens group G2, the face distance d11 between the second lens group G2 and the third lens group G3, the face distance d15 between the aperture IR and the fourth lens group G4 and the face distance d18 between the fourth lens group G4 and the fifth lens group G5 vary. The variation distances in the wide angle end state, intermediate focal length state and telephoto end state of the face distances in the numerical value example 1 are indicated in Table 2.

TABLE 2

| F | 5.18 | 9.99 | 19.30 |
|---|---|---|---|
| d6 | 0.41 | 3.67 | 5.73 |
| d11 | 5.73 | 2.47 | 0.41 |
| d15 | 6.93 | 3.88 | 0.67 |
| d18 | 2.21 | 5.26 | 8.47 |

In the zoom lens 1, the opposite faces of the third lens L13 of the first lens group G1, that is, the fifth and sixth faces, the image side face of the fourth lens L21 of the second lens group G2, that is, the eighth face, the opposite faces of the seventh lens L31 of the third lens group G3, that is, the twelfth and thirteenth faces, the object side face of the eighth lens L41 of the fourth lens group G4, that is, the 16th face, the object side face of the eleventh lens L52 of the fifth lens group G5, that is, the 21st face, and the object side face of the twelfth lens L53 of the fifth lens group G5, that is, the 23rd face, are formed as an aspheric face. The fourth-, sixth-, eighth- and tenth-order aspheric face coefficients A4, A6, A8 and A10 of the aspheric faces in the numerical value example 1 are indicated in Table 3 together with the conic constant K.

TABLE 3

| | s5 | s6 | s8 | s12 |
|---|---|---|---|---|
| K | 0 | 0 | 0 | 0 |
| A4 | −1.7289E−04 | 7.6236E−05 | −6.2608E−04 | −2.7142E−04 |
| A6 | −4.1464E−07 | 6.0889E−07 | −9.2775E−06 | 1.8064E−05 |
| A8 | −1.5324E−08 | −1.2592E−08 | −4.6604E−08 | −2.2615E−07 |
| A10 | 0.0000E+10 | 0.0000E+00 | 0.0000E+00 | −4.3199E−10 |

| | s13 | s16 | s21 | s23 |
|---|---|---|---|---|
| K | 0 | 0 | 0 | |
| A4 | 1.0737E−04 | −2.2144E−04 | −1.1160E−04 | −4.8168E−05 |
| A5 | 1.4482E−05 | 3.0754E−06 | 1.9553E−06 | −1.7163E−06 |

TABLE 3-continued

| A8  | 0.0000E+00 | −1.7154E−07 | −7.0762E−08 | 0.0000E+00 |
| A10 | 0.0000E+00 | 3.8008E−00  | 0.0000E+00  | 0.0000E+00 |

Figure 2:
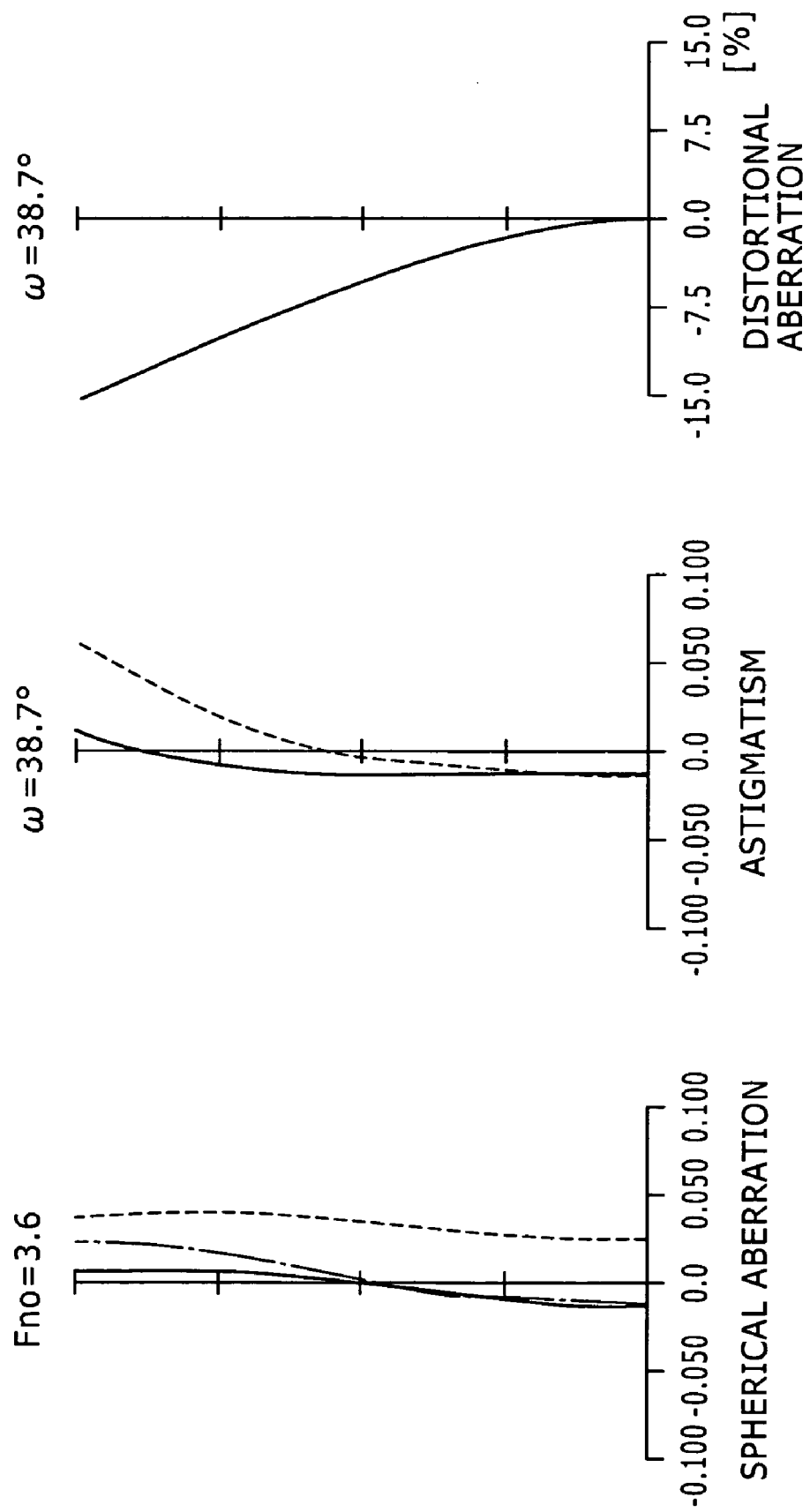
FIG. 2 is a diagrammatic view illustrating a spherical aberration, an astigmatism and a distortional aberration in a wide angle end state of the zoom lens of FIG. 1 according to a numerical value example wherein particular numerical values are applied to the zoom lens.
Figure 3:
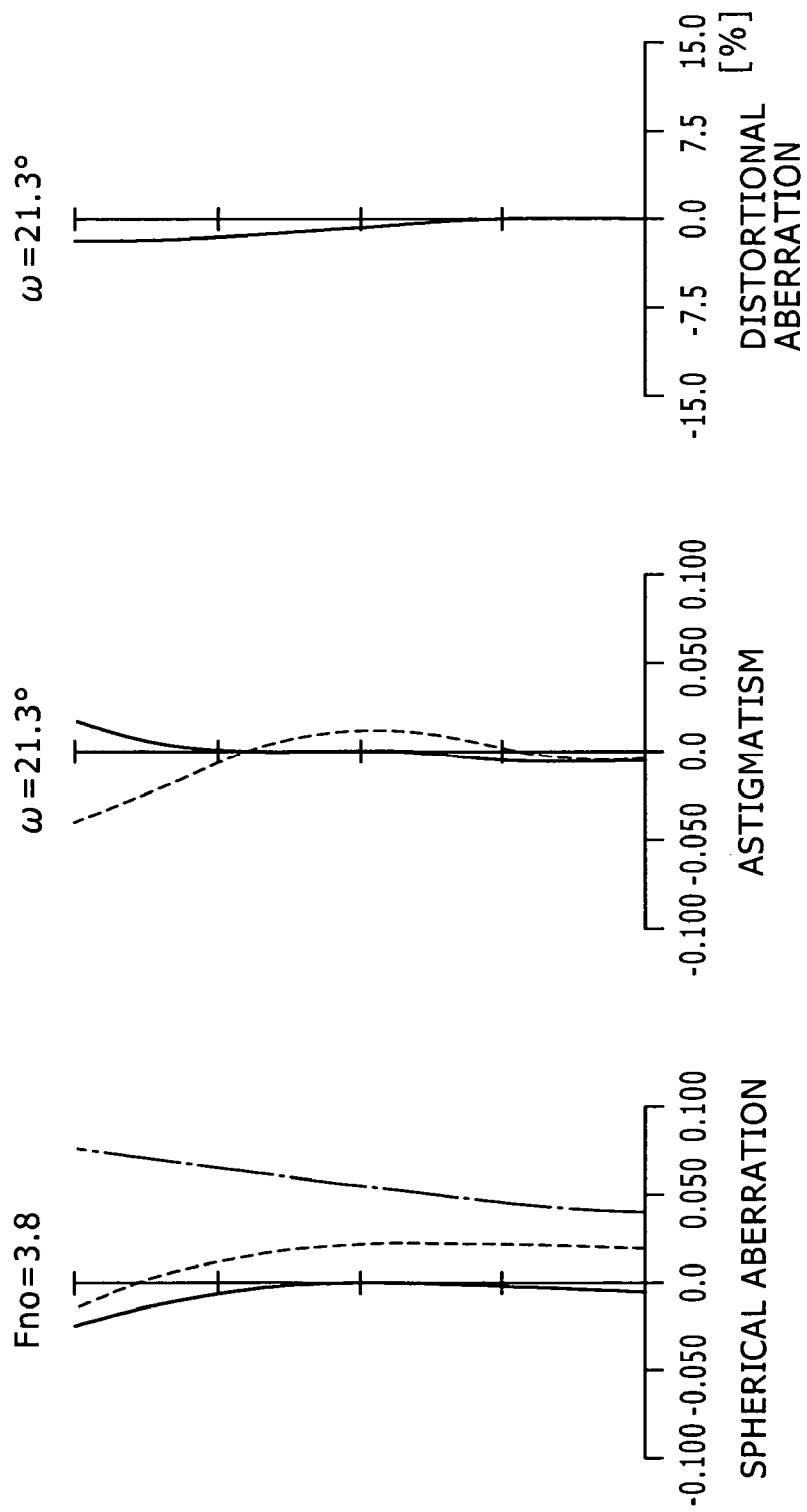
FIG. 3 is a similar view but illustrating a spherical aberration, an astigmatism and a distortional aberration in an intermediate focal length state of the zoom lens of FIG. 1 according to the same numerical value example.
Figure 4:
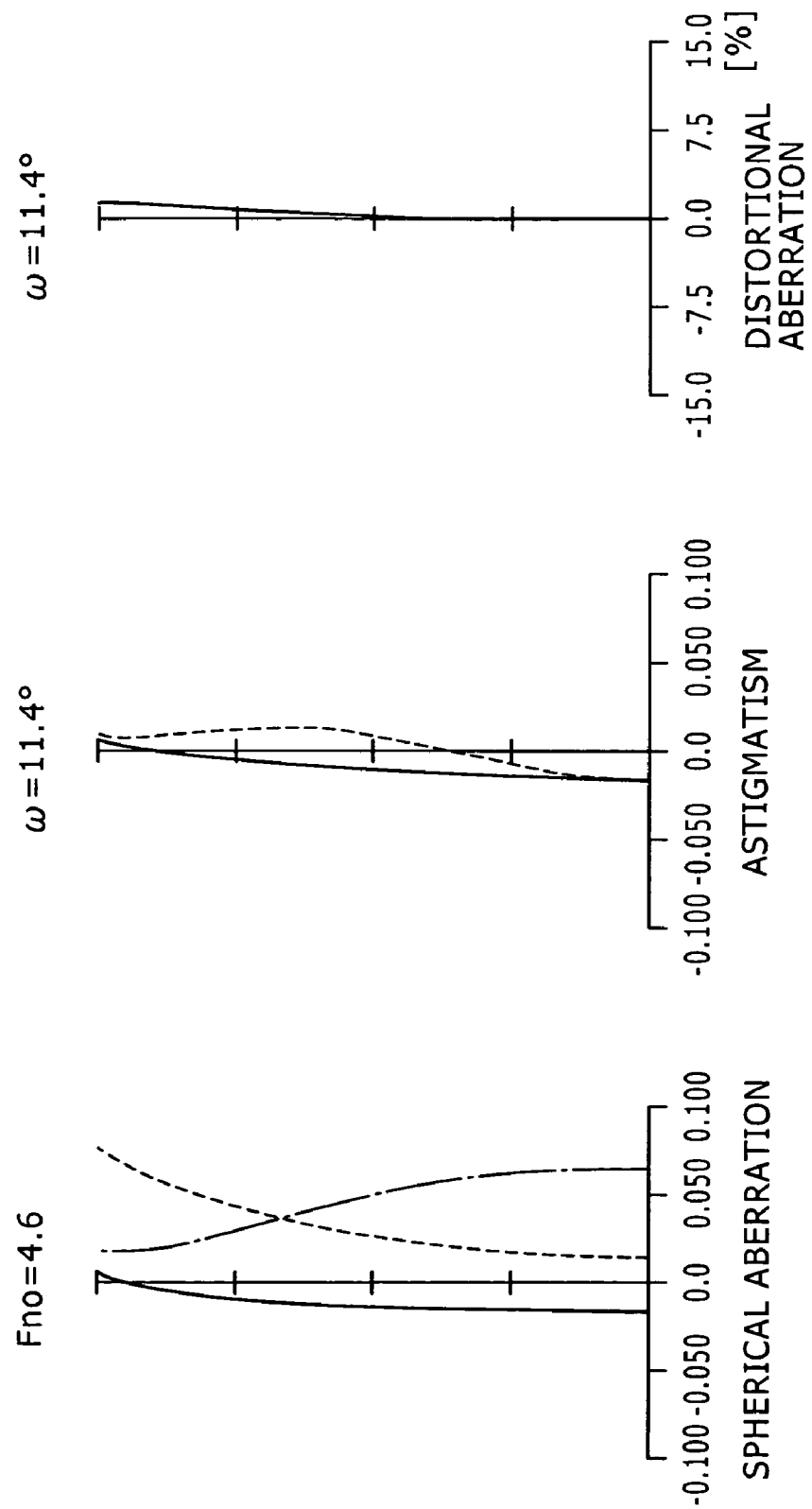
FIG. 4 is a similar view but illustrating a spherical aberration, an astigmatism and a distortional aberration in a telephoto end state of the zoom lens of the zoom lens of FIG. 1 according to the same numerical value example.

FIGS. 2 to 4 illustrate several aberrations in an infinitely focused state of the numerical value example 1. More particularly, FIGS. 2, 3 and 4 illustrate a spherical aberration, an astigmatism and a distortional aberration in the wide angle end state, intermediate focal length state and telephoto end state, respectively.

In FIGS. 2 to 4, for the spherical aberration, a solid line indicates the spherical aberration with regard to the d-line (wavelength 587.6 nm); an alternate long and short dash line indicates the spherical aberration with regard to the g-line (wavelength 435.8 nm); and a broken line indicates the spherical aberration with regard to the C-line (wavelength 656.3 nm). For the astigmatism, a solid line indicates values of the astigmatism on a sagittal image surface while a broken line indicates values of the astigmatism on a meridional image surface.

From the views of the aberrations, it can be recognized apparently that the numerical value example 1 has a superior image forming performance with the various aberrations corrected favorably.

Second Embodiment

Figure 5:
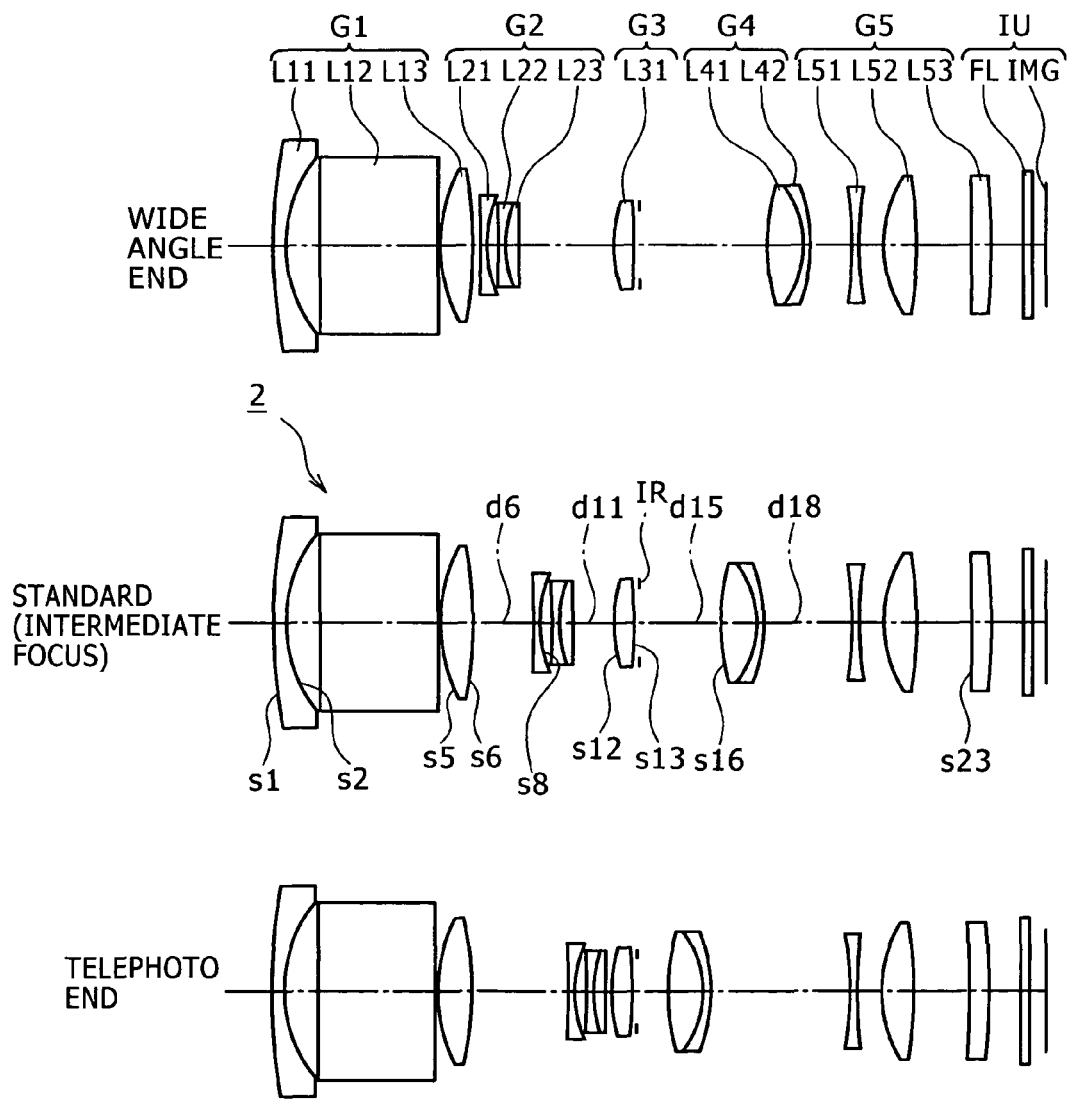
FIG. 5 is a schematic view showing a lens configuration of a zoom lens according to a second embodiment of the present invention.

FIG. 5 shows a lens configuration of a zoom lens 2 according to a second embodiment of the present invention.

Referring to FIG. 5, the zoom lens 2 shown has a magnification ratio of 3.72 times.

The zoom lens 2 includes a first lens group G1 having a positive refracting power, a second lens group G2 having a negative refracting power, a third lens group G3 having a positive refracting power, a fourth lens group G4 having a positive refracting power, and a fifth lens group G5 having a negative refracting power. The first lens group G1, second lens group G2, third lens group G3, fourth lens group G4 and fifth lens group G5 are disposed in order from the object side toward the image side.

The first lens group G1 includes a first lens or front side lens L11 having a negative refracting power, a prism L12 serving as an optical member for bending the optical axis by 90°, and a third lens or rear side lens L13 having a positive refracting power. The first lens L11, prism L12 and third lens L13 are disposed in order from the object side toward the image side.

The first lens group G1 has a position fixed in the direction of the optical axis upon zooming. Since the prism L12 is disposed in the first lens group G1 to bend the optical axis by 90°, reduction in thickness of the image pickup apparatus and the zoom lens in the thicknesswise direction can be anticipated.

The second lens group G2 includes a fourth lens L21 having a negative refracting power and a cemented lens including a fifth lens L22 having a negative refracting power and a sixth lens L23 having a positive refracting power and cemented to the fifth lens L22. The fourth lens L21 and the fifth lens L22 are disposed in order from the object side toward the image side.

The second lens group G2 is moved from the object side toward the image side upon zooming from the wide angle end toward the telephoto end.

The fourth lens L21 of the second lens group G2 is a concavo-concave lens whose face on the image side has an aspheric shape. Since the fourth lens L21 is formed as a concavo-concave lens whose face on the image side has an aspheric shape, the magnification chromatic aberration in a wide angle range and the comatic aberration in a telephoto range can be corrected efficiently.

The third lens group G3 includes a seventh lens L31 having a positive refracting power.

The third lens group G3 has a position fixed in the direction of the optical axis upon zooming.

The fourth lens group G4 includes a cemented lens including an eighth lens L41 having a positive refracting power and a ninth lens L42 having a negative refracting power and cemented to the eighth lens L41.

The fourth lens group G4 is moved from the image side toward the object side upon zooming from the wide angle end toward the telephoto end and is movable along the optical direction also upon focusing.

The fifth lens group G5 includes a tenth lens L51 having a negative refracting power, an eleventh lens or first positive lens L52 having a positive refracting power and movable in a direction perpendicular to the optical axis, and a twelfth lens L53 having a positive refracting power. The tenth lens L51, eleventh lens L52 and twelfth lens L53 are disposed in order from the object side toward the image side.

The tenth lens L51 of the fifth lens group G5 is formed as a concavo-concave lens. Since the tenth lens L51 is formed as a concavo-concave lens, appearance of the magnification chromatic aberration in the wide angle range can be suppressed.

The twelfth lens L53 of the fifth lens group G5 has an aspheric face. Since the twelfth lens L53 has an aspheric face, the curvature of field particularly in the wide angle region can be corrected effectively and the variation of the aberrations when the eleventh lens L52 moves in a direction perpendicular to the optical axis can be suppressed.

The twelfth lens L53 of the fifth lens group G5 is formed from a resin material. Since the twelfth lens L53 is formed from a resin material, reduction of the cost can be achieved.

The aperture IR is disposed in the proximity of and on the image side of the third lens group G3.

Lens data of the numerical value example 2 where particular numerical values are applied to the zoom lens 2 of the second embodiment are indicated in Table 4 together with the F number Fno and a half angle w of view in a wide angle end state (F=4.61), an intermediate focal length state (F=8.89) and a telephoto end state (F=17.17).

TABLE 4

F = 4.61~8.89~17.17
Fno = 3.5~3.9~4.8
ω = 42.0°~23.7°~12.8°

| si | | ri | di | ni | vi | DIAi |
|---|---|---|---|---|---|---|
| 1  | Aspheric  | 28.000  | 0.80 | 1.9229 | 20.8 | 5.82 |
| 2  | Aspheric  | 7.919   | 2.25 |        |      | 4.96 |
| 3  | (Prism)   | ∞       | 7.40 | 1.9037 | 31.3 | 4.82 |
| 4  |           | ∞       | 0.20 |        |      | 4.26 |
| 5  | Aspheric  | 8.678   | 2.10 | 1.6935 | 53.2 | 4.10 |
| 6  | Aspheric  | −22.360 | d6   |        |      | 4.10 |
| 7  |           | −20.714 | 0.42 | 1.8513 | 40.1 | 2.47 |
| 8  | Aspheric  | 5.755   | 0.81 |        |      | 2.18 |
| 9  |           | −22.097 | 0.40 | 1.8830 | 40.8 | 2.10 |
| 10 |           | 7.592   | 0.85 | 1.9229 | 20.8 | 2.12 |
| 11 |           | 396.289 | d11  |        |      | 2.13 |
| 12 | Aspheric  | 10.890  | 1.30 | 1.7308 | 40.5 | 2.28 |
| 13 | Aspheric  | −52.416 | 0.20 |        |      | 2.20 |
| 14 | (Aperture)| ∞       | 1.50 |        |      | 2.16 |
| 15 |           | ∞       | d15  |        |      | 2.52 |
| 16 | Aspheric  | 13.813  | 2.30 | 1.6226 | 58.1 | 3.17 |

TABLE 4-continued

F = 4.61~8.89~17.17
Fno = 3.5~3.9~4.8
ω = 42.0°~23.7°~12.8°

| si | | ri | di | ni | vi | DIAi |
|---|---|---|---|---|---|---|
| 17 | | −5.821 | 0.40 | 1.7618 | 26.6 | 3.16 |
| 18 | | −11.024 | d18 | | | 3.20 |
| 19 | | −15.516 | 0.42 | 1.9229 | 20.9 | 3.01 |
| 20 | | 25.236 | 1.60 | | | 3.08 |
| 21 | | 9.563 | 2.10 | 1.4849 | 70.4 | 3.81 |
| 22 | | −36.519 | 3.70 | | | 3.85 |
| 23 | Aspheric | 65.651 | 1.00 | 1.5250 | 56.5 | 3.78 |
| 24 | | −100.000 | 2.10 | | | 3.85 |
| 25 | | ∞ | 0.50 | 1.5567 | 58.5 | 4.05 |
| 26 | | ∞ | 1.00 | | | 4.08 |

Upon zooming between the wide angle end state and the telephoto end state of the zoom lens 2, the face distance d6 between the first lens group G1 and the second lens group G2, the face distance d11 between the second lens group G2 and the third lens group G3, the face distance d15 between the aperture IR and the fourth lens group G4 and the face distance d18 between the fourth lens group G4 and the fifth lens group G5 vary. The variation distances in the wide angle end state, intermediate focal length state and telephoto end state of the face distances in the numerical value example 2 are indicated in Table 5.

TABLE 5

| F | 4.61 | 8.89 | 17.17 |
|---|---|---|---|
| d6 | 0.41 | 3.94 | 6.16 |
| d11 | 6.16 | 2 63 | 0.41 |
| d15 | 6.89 | 3.98 | 0.57 |
| d18 | 2.66 | 5.58 | 8.99 |

In the zoom lens 2, the opposite faces of the first lens L11 of the first lens group G1, that is, the first and second faces, the opposite faces of the third lens L13 of the first lens group G1, that is, the fifth and sixth faces, the image side face of the fourth lens L2.1 of the second lens group G2, that is, the eighth face, the opposite faces of the seventh lens L31 of the third lens group G3, that is, the twelfth and thirteenth faces, the object side face of the eighth lens L41 of the fourth lens group G4, that is, the sixteenth face, and the object side face of the twelfth lens L53 of the fifth lens group G5, that is, the 23rd face, are formed as an aspheric face. The fourth-, sixth-, eighth- and tenth-order aspheric face coefficients A4, A6, A8 and A10 of the aspheric faces in the numerical value example 2 are indicated in Table 6 together with the conic constant K.

Figure 6:
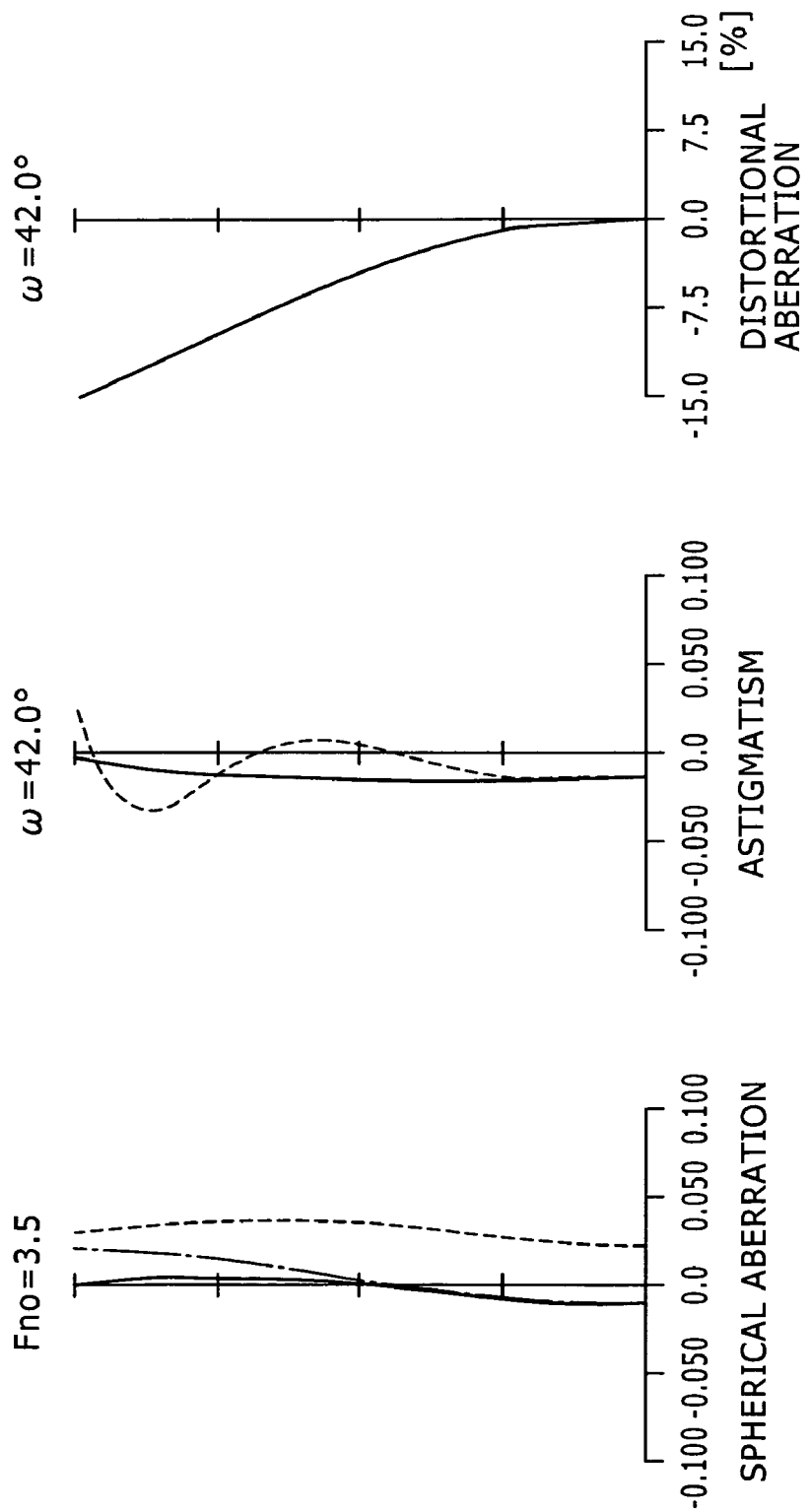
FIG. 6 is a diagrammatic view illustrating a spherical aberration, an astigmatism and a distortional aberration in a wide angle end state of the zoom lens of FIG. 5 according to another numerical value example wherein particular numerical values are applied to the zoom lens.
Figure 7:
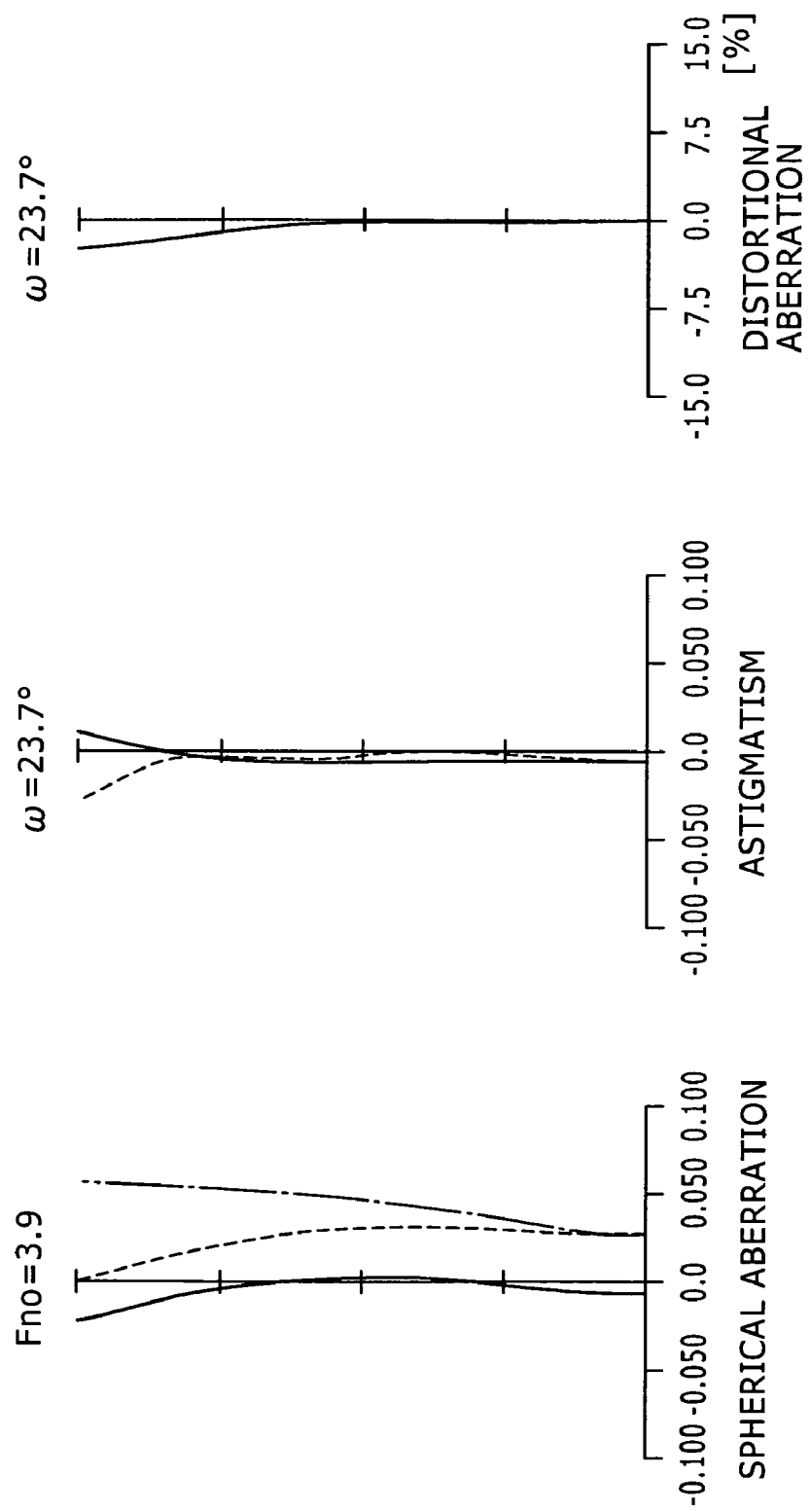
FIG. 7 is a similar view but illustrating a spherical aberration, an astigmatism and a distortional aberration in an intermediate focal length state of the zoom lens of FIG. 5 according to the same numerical value example.
Figure 8:
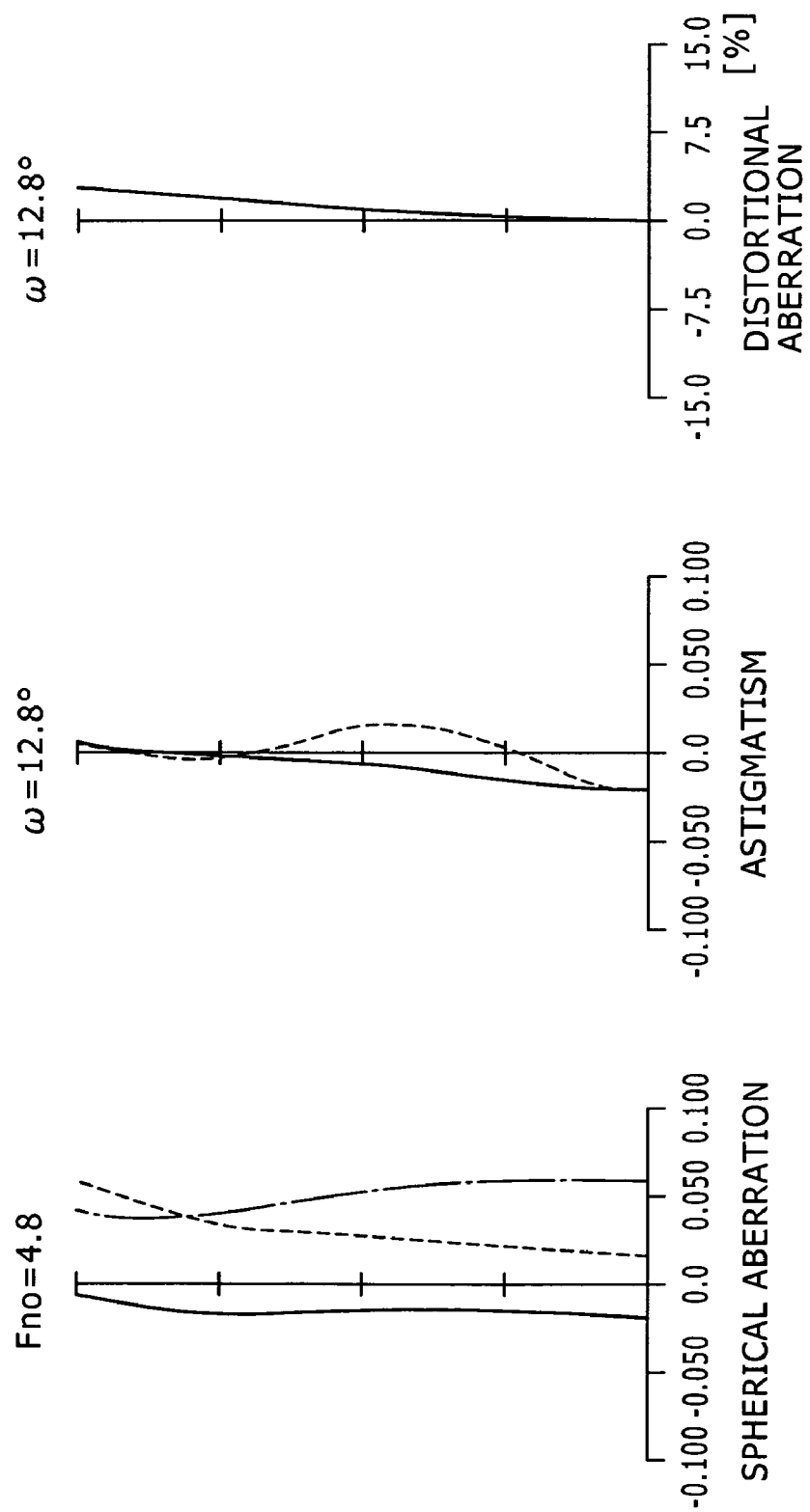
FIG. 8 is a similar view but illustrating a spherical aberration, an astigmatism and a distortional aberration in a telephoto end state of the zoom lens of the zoom lens of FIG. 5 according to the same numerical value example.

FIGS. 6 to 8 illustrate several aberrations in an infinitely focused state of the numerical value example 2. More particularly, FIGS. 6, 7 and 8 illustrate a spherical aberration, an astigmatism and a distortional aberration in the wide angle end state, intermediate focal length state and telephoto end state, respectively.

In FIGS. 6 to 8, for the spherical aberration, a solid line indicates the spherical aberration with regard to the d-line (wavelength 587.6 nm); an alternate long and short dash line indicates the spherical aberration with regard to the g-line (wavelength 435.8 nm); and a broken line indicates the spherical aberration with regard to the C-line (wavelength 656.3 nm). For the astigmatism, a solid line indicates values of the astigmatism on a sagittal image surface while a broken line indicates values of the astigmatism on a meridional image surface.

From the views of the aberrations, it can be recognized apparently that the numerical value example 2 has a superior image forming performance with the various aberrations corrected favorably.

Third Embodiment

Figure 9:
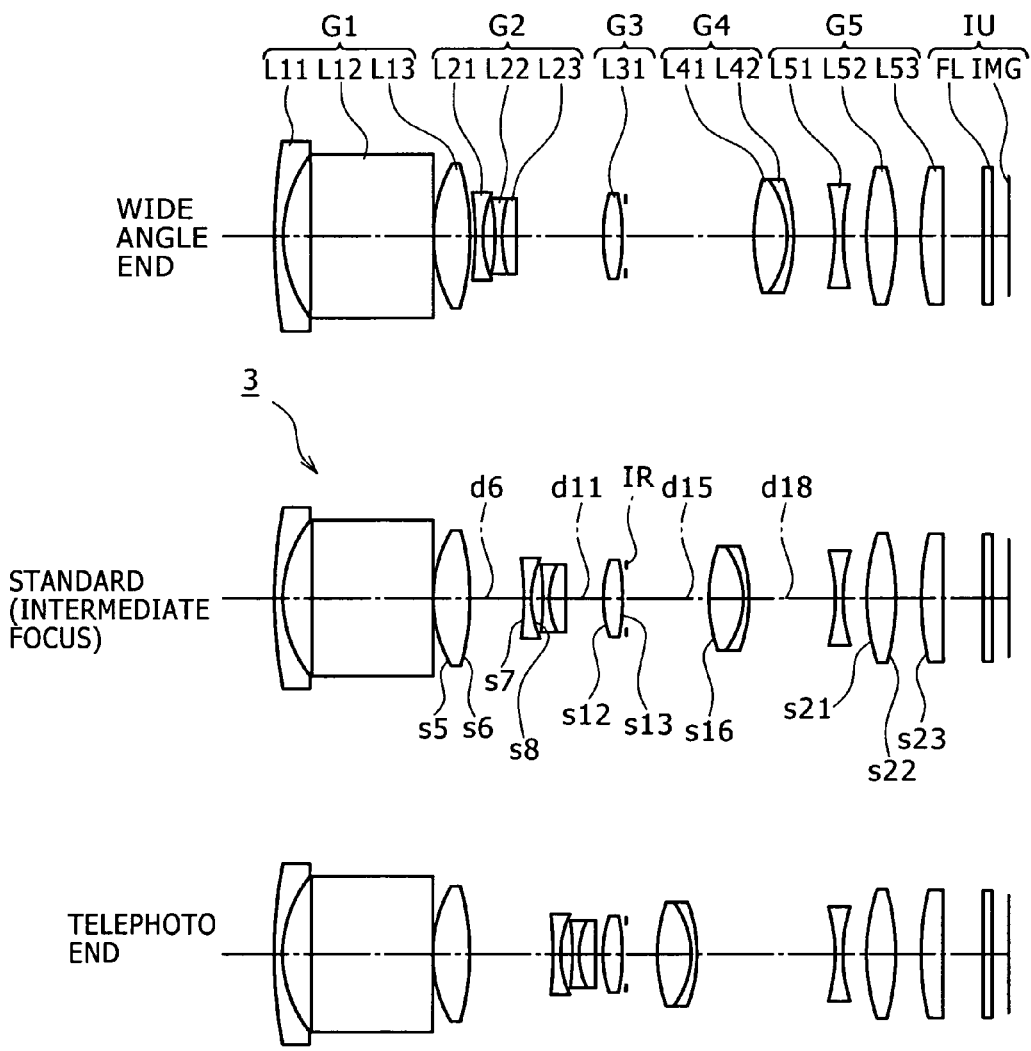
FIG. 9 is a schematic view showing a lens configuration of a zoom lens according to a third embodiment of the present invention.

FIG. 9 shows a lens configuration of a zoom lens 3 according to a third embodiment of the present invention.

Referring to FIG. 9, the zoom lens 3 shown has a magnification ratio of 3.73 times.

The zoom lens 3 includes a first lens group G1 having a positive refracting power, a second lens group G2 having a negative refracting power, a third lens group G3 having a positive refracting power, a fourth lens group G4 having a positive refracting power, and a fifth lens group G5 having a positive refracting power. The first lens group G1, second lens group G2, third lens group G3, fourth lens group G4 and fifth lens group G5 are disposed in order from the object side toward the image side.

The first, lens group G1 includes a first lens or front side lens L11 having a negative refracting power, a prism L12 serving as an optical member for bending the optical axis by 90°, and a third lens or rear side lens L13 having a positive refracting power. The first lens L11, prism L12 and third lens L13 are disposed in order from the object side toward the image side.

The first lens group G1 has a position fixed in the direction of the optical axis upon zooming. Since the prism L12 is disposed in the first lens group G1 to bend the optical axis by 90°, reduction in thickness of the image pickup apparatus and the zoom lens in the thicknesswise direction can be anticipated.

TABLE 6

| | s1 | s2 | s5 | s6 | s8 |
|---|---|---|---|---|---|
| K | 0 | 0 | 0 | 0 | 0 |
| A4 | −4.9224E−04 | −7.5461E−04 | −3.6414E−04 | −8.2666E−05 | −7.4933E−04 |
| A6 | 1.2104E−05 | 1.2637E−05 | 1.6725E−06 | 4.3306E−06 | −1.1011E−05 |
| A8 | −9.2815E−08 | −3.5691E−08 | −1.7968E−07 | −2.2578E−07 | 1.8283E−07 |
| A10 | 0.0000E+00 | 0.0000E+00 | 4.3750E−09 | 5.6079E−09 | 0.0000E+00 |

| | s12 | s13 | s16 | s23 |
|---|---|---|---|---|
| K | 0 | 0 | 0 | 0 |
| A4 | −1.0742E−04 | 1.0446E−04 | −2.5912E−04 | −9.9858E−04 |
| A6 | 2.9190E−05 | 2.6386E−05 | 5.4794E−06 | 2.4656E−05 |
| A8 | −7.9150E−07 | 0.0000E+00 | −4.6459E−07 | −1.8181E−06 |
| A10 | 4.8909E−08 | 0.0000E+00 | 1.7762E−08 | 4.1360E−08 |

The second lens group G2 includes a fourth lens L21 having a negative refracting power and a cemented lens including a fifth lens L22 having a negative refracting power and a sixth lens L23 having a positive refracting power and cemented to the fifth lens L22. The fourth lens L21 and the cemented lens of the fifth lens L22 and the sixth lens L23 are disposed in order from the object side toward the image side.

The second lens group G2 is moved from the object side toward the image side upon zooming from the wide angle end toward the telephoto end.

The fourth lens L21 of the second lens group G2 is a concavo-concave lens whose faces on the object side and the image side have an aspheric shape. Where the fourth lens L21 is formed as a concavo-concave lens whose face on the image side has an aspheric shape, the magnification chromatic aberration in a wide angle range and the comatic aberration in a telephoto range can be corrected efficiently.

The third lens group G3 includes a seventh lens L31 having a positive refracting power.

The third lens group G3 has a position fixed in the direction of the optical axis upon zooming.

The fourth lens group G4 includes a cemented lens including an eighth lens L41 having a positive refracting power and a ninth lens L42 having a negative refracting power and cemented to the eighth lens L41.

The fourth lens group G4 is moved from the image side toward the object side upon zooming from the wide angle end toward the telephoto end and is movable along the optical direction also upon focusing.

The fifth lens group G5 includes a tenth lens L51 having a negative refracting power, an eleventh lens or first positive lens L52 having a positive refracting power and movable in a direction perpendicular to the optical axis to shift an image, and a twelfth lens or second positive lens L53 having a positive refracting power. The tenth lens L51, eleventh lens L52 and twelfth lens L53 are disposed in order from the object side toward the image side.

The tenth lens L51 of the fifth lens group G5 is formed as a concavo-concave lens. Where the tenth lens L51 is formed as a concavo-concave lens, appearance of the magnification chromatic aberration in the wide angle range can be suppressed.

The tenth lens L51 of the fifth lens group G5 has an equal radius of curvature between the face on the object side and the face on the image side thereof. Since the tenth lens L51 has an equal radius of curvature between the face on the object side and the face on the image side thereof, the tenth lens L51 has a symmetrical shape in the direction of the optical axis. Consequently, assembly of the zoom lens 3 can be facilitated.

The eleventh lens L52 and the twelfth lens L53 of the fifth lens group G5 have an aspheric face. Since the eleventh lens L52 and the twelfth lens L53 have an aspheric face, the curvature of field particularly in the wide angle region can be corrected effectively and the variation of the aberrations when the eleventh lens L52 moves in a direction perpendicular to the optical axis can be suppressed.

The eleventh lens L52 of the fifth lens group G5 is formed from a resin material. Since the eleventh lens L52 is formed from a resin material, reduction of the cost can be achieved and movement of the eleventh lens L52 in the direction perpendicular to the optical axis can be facilitated by reduction of the weight.

The aperture IR is disposed in the proximity of and on the image side of the third lens group G3.

Lens data of the numerical value example 3 where particular numerical values are applied to the zoom lens 3 of the third embodiment are indicated in Table 7 together with the F number Fno and a half angle ω of view in a wide angle end state (F=4.59), an intermediate focal length state (F=8.69) and a telephoto end state (F=17.10).

TABLE 7

F = 4.59~8.69~17.10
Fno = 3.6~3.8~4.7
ω = 41.5°~23.7°~12.2°

| si | | ri | di | ni | vi | DIAi |
|---|---|---|---|---|---|---|
| 1 | | 47.319 | 0.50 | 1.9229 | 20.8 | 5.61 |
| 2 | | 9.412 | 1.90 | | | 4.92 |
| 3 | (Prism) | ∞ | 8.00 | 1.9037 | 31.3 | 4.85 |
| 4 | | ∞ | 0.13 | | | 4.27 |
| 5 | Aspheric | 9.303 | 2.30 | 1.6935 | 53.2 | 4.12 |
| 6 | Aspheric | −18.057 | d6 | | | 4.12 |
| 7 | Aspheric | −22.576 | 0.45 | 1.8513 | 40.1 | 2.38 |
| 8 | Aspheric | 5.394 | 0.85 | | | 2.07 |
| 9 | | −13.895 | 0.40 | 1.8830 | 40.8 | 2.00 |
| 10 | | 7.975 | 0.96 | 1.9459 | 17.9 | 2.02 |
| 11 | | 354.677 | d11 | | | 2.07 |
| 12 | Aspheric | 9.473 | 1.35 | 1.5831 | 59.4 | 2.34 |
| 13 | Aspheric | −16.204 | 0.20 | | | 2.29 |
| 14 | (Aperture) | ∞ | 1.50 | | | 2.24 |
| 15 | | ∞ | d15 | | | 2.60 |
| 16 | Aspheric | 12.010 | 2.24 | 1.6226 | 58.1 | 3.02 |
| 17 | | −5.900 | 0.40 | 1.8052 | 25.4 | 3.06 |
| 18 | | −11.252 | d18 | | | 3.14 |
| 19 | | −12.153 | 0.45 | 1.8467 | 23.7 | 2.79 |
| 20 | | 12.153 | 1.60 | | | 2.85 |
| 21 | Aspheric | 14.526 | 1.92 | 1.5250 | 56.5 | 3.75 |
| 22 | Aspheric | −14.468 | 1.64 | | | 3.89 |
| 23 | Aspheric | 18.371 | 1.53 | 1.5831 | 59.4 | 3.85 |
| 24 | | ∞ | 2.85 | | | 3.84 |
| 25 | | ∞ | 0.50 | 1.5567 | 58.5 | 3.80 |
| 26 | | ∞ | 1.00 | | | 3.80 |

Upon zooming between the wide angle end state and the telephoto end state of the zoom lens 3, the face distance d6 between the first lens group G1 and the second lens group G2, the face distance d11 between the second lens group G2 and the third lens group G3, the face distance d15 between the aperture IR and the fourth lens group G4 and the face distance d18 between the fourth lens group G4 and the fifth lens group G5 vary. The variation distances in the wide angle end state, intermediate focal length state and telephoto end state of the face distances in the numerical value example 3 are indicated in Table 8.

TABLE 8

| F | 4.59 | 8.69 | 17.10 |
|---|---|---|---|
| d6 | 0.41 | 3.75 | 5.91 |
| d11 | 5.91 | 2.57 | 0.41 |
| d15 | 7.05 | 4.08 | 0.63 |
| d18 | 2.80 | 5.77 | 9.22 |

In the zoom lens 3, the opposite faces of the third lens L13 of the first lens group G1, that is, the fifth and sixth faces, the opposite faces of the fourth lens L21 of the second lens group G2, that is, the seventh and eighth faces, the opposite faces of the seventh lens L31 of the third lens group G3, that is, the twelfth and thirteenth faces, the object side face of the eighth lens L41 of the fourth lens group G4, that is, the sixteenth face, the opposite faces of the eleventh lens L52 of the fifth lens group G5, that is, the 21st and 22nd faces, and the object side face of the twelfth lens L53 of the fifth lens group G5, that is, the 23rd face, are formed as an aspheric face. The fourth-, sixth-, eighth- and tenth-order aspheric face coefficients A4, A6, A8 and A10 of the aspheric faces in the numerical value example 3 are indicated in Table 9 together with the conic constant K.

TABLE 9

| | s5 | s6 | s7 | s8 | s12 | s13 | s16 |
|---|---|---|---|---|---|---|---|
| K  | 0 | 0 | 0 | 0 | 0 | 0 | 0 |
| A4 | −1.6597E−04 | 9.5523E−05 | 1.5300E−04 | −5.9563E−04 | −4.5480E−04 | −3.9763E−06 | −2.5501E−04 |
| A6 | −1.1413E−06 | −7.4440E−07 | 0.0000E+00 | −7.0422E−06 | 4.3320E−05 | 2.8663E−05 | 4.6918E−06 |
| A8 | −3.2882E−08 | −9.3350E−09 | 0.0000E+00 | 1.3232E−06 | −2.3393E−06 | 0.0000E+00 | −2.9077E−07 |
| A10 | 0.0000E+00 | 0.0000E+00 | 0.0000E+00 | 0.0000E+00 | 1.3548E−07 | 0.0000E+00 | 9.1720E−09 |

| | s21 | s22 | s23 |
|---|---|---|---|
| K  | 0 | 0 | 0 |
| A4 | 2.8253E−04 | 5.0285E−04 | 5.7005E−06 |
| A6 | −1.1962E−05 | −1.5604E−05 | −7.9311E−06 |
| A8 | −1.3772E−22 | −2.2893E−23 | 0.0000E+00 |
| A10 | 0.0000E+00 | 0.0000E+00 | 0.0000E+00 |

Figure 10:
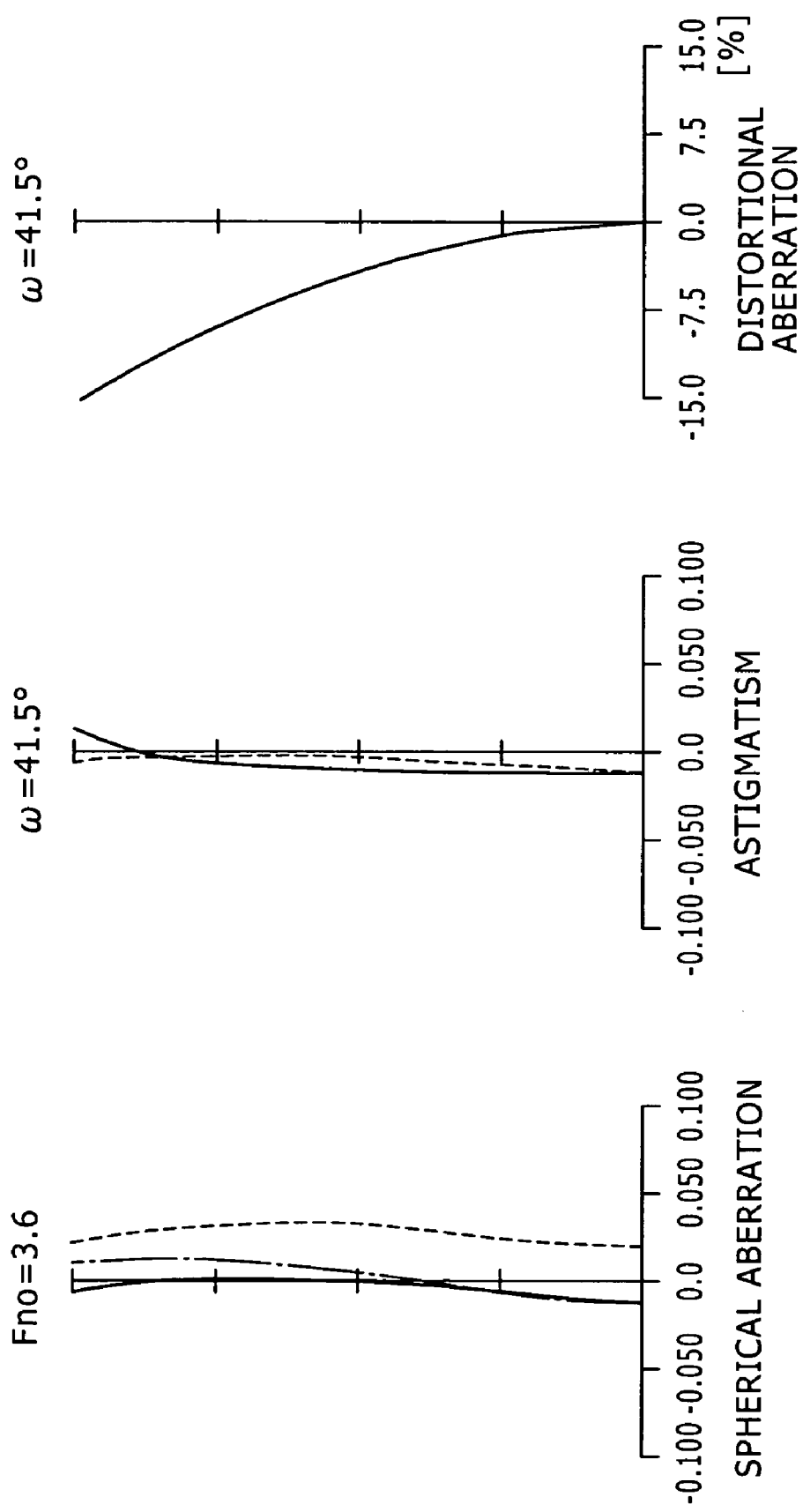
FIG. 10 is a diagrammatic view illustrating a spherical aberration, an astigmatism and a distortional aberration in a wide angle end state of the zoom lens of FIG. 9 according to a further numerical value example wherein particular numerical values are applied to the zoom lens.
Figure 11:
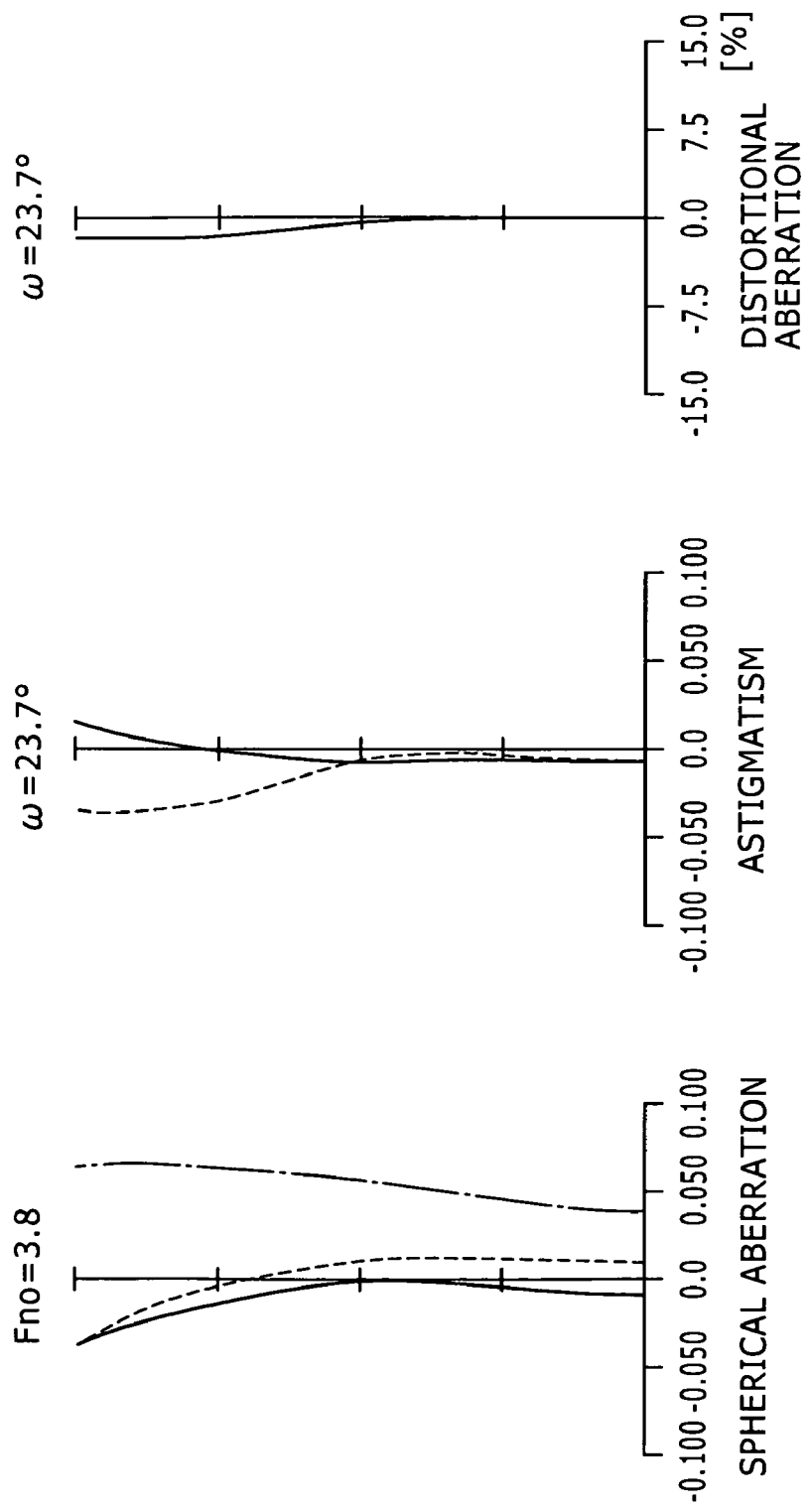
FIG. 11 is a similar view but illustrating a spherical aberration, an astigmatism and a distortional aberration in an intermediate focal length state of the zoom lens of FIG. 9 according to the same numerical value example.
Figure 12:
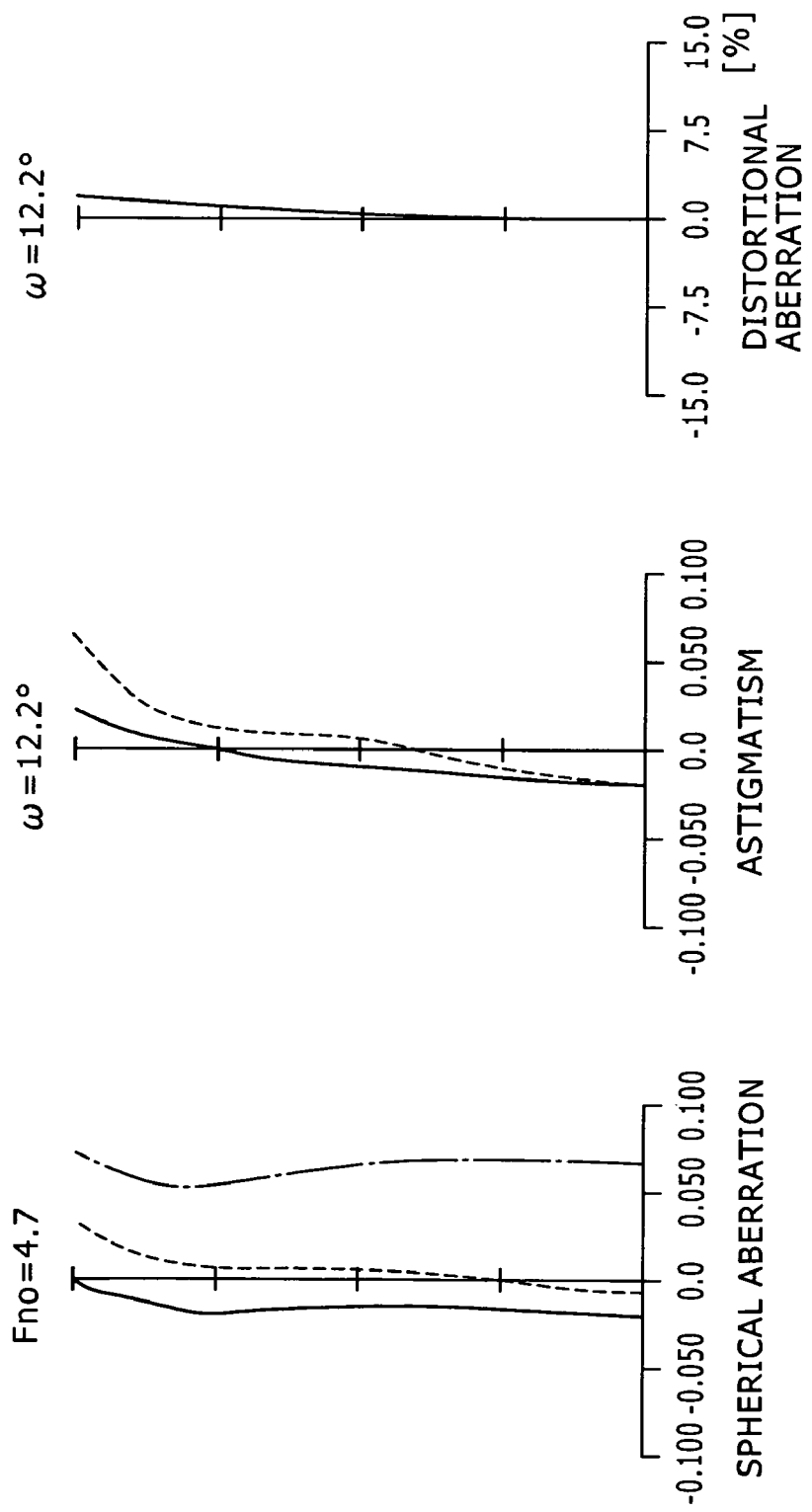
FIG. 12 is a similar view but illustrating a spherical aberration, an astigmatism and a distortional aberration in a telephoto end state of the zoom lens of the zoom lens of FIG. 9 according to the same numerical value example.

FIGS. 10 to 12 illustrate several aberrations in an infinitely focused state of the numerical value example 3. More particularly, FIGS. 10, 11 and 12 illustrate a spherical aberration, an astigmatism and a distortional aberration in the wide angle end state, intermediate focal length state and telephoto end state, respectively.

In FIGS. 10 to 12, for the spherical aberration, a solid line indicates the spherical aberration with regard to the d-line (wavelength 587.6 nm); an alternate long and short dash line indicates the spherical aberration with regard to the g-line (wavelength 435.8 nm); and a broken line indicates the spherical aberration with regard to the C-line (wavelength 656.3 nm). For the astigmatism, a solid line indicates values of the astigmatism on a sagittal image surface while a broken line indicates values of the astigmatism on a meridional image surface.

From the views of the aberrations, it can be recognized apparently that the numerical value example 3 has a superior image forming performance with the various aberrations corrected favorably.

Fourth Embodiment

Figure 13:
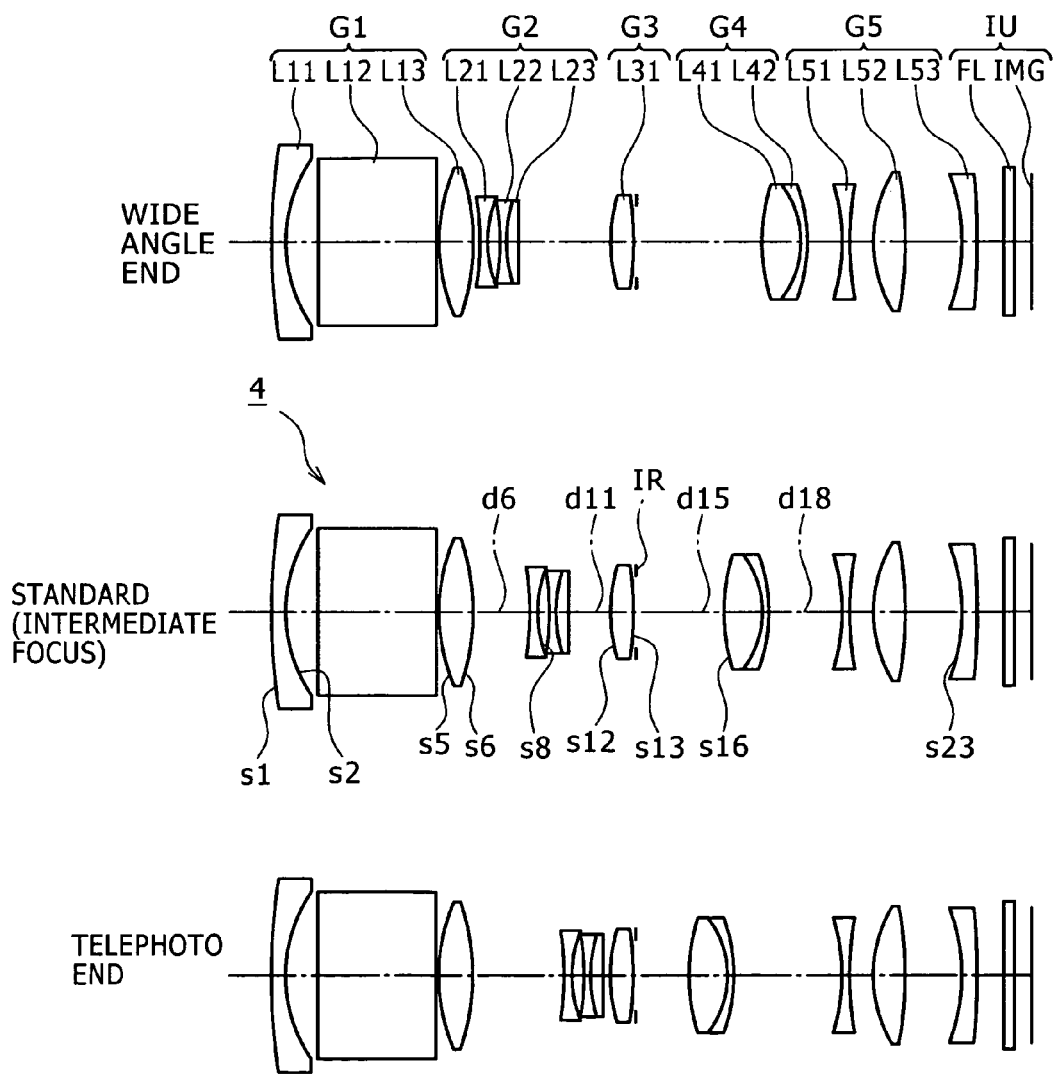
FIG. 13 is a schematic view showing a lens configuration of a zoom lens according to a fourth embodiment of the present invention.

FIG. 13 shows a lens configuration of a zoom lens 4 according to a fourth embodiment of the present invention.

Referring to FIG. 13, the zoom lens 4 shown has a magnification ratio of 3.07 times.

The zoom lens 4 includes a first lens group G1 having a positive refracting power, a second lens group G2 having a negative refracting power, a third lens group G3 having a positive refracting power, a fourth lens group G4 having a positive refracting power, and a fifth lens group G5 having a positive refracting power. The first lens group G1, second lens group G2, third lens group G3, fourth lens group G4 and fifth lens group G5 are disposed in order from the object side toward the image side.

The first lens group G1 includes a first lens or front side lens L11 having a negative refracting power, a prism L12 serving as an optical member for bending the optical axis by 90°, and a third lens or rear side lens L13 having a positive refracting power. The first lens L11, prism L12 and third lens L13 are disposed in order from the object side toward the image side.

The first lens group G1 has a position fixed in the direction of the optical axis upon zooming. The prism L12 is disposed in the first lens group G1 to bend the optical axis by 90°, reduction in thickness of the image pickup apparatus and the zoom lens in the thicknesswise direction can be anticipated.

The second lens group G2 includes a fourth lens L21 having a negative refracting power and a cemented lens including a fifth lens L22 having a negative refracting power and a sixth lens L23 having a positive refracting power and cemented to the fifth lens L22. The fourth lens L21, fifth lens L22 and sixth lens L23 are disposed in order from the object side toward the image side.

The second lens group G2 is moved from the object side toward the image side upon zooming from the wide angle end toward the telephoto end.

The fourth lens L21 of the second lens group G2 is a concavo-concave lens whose face on the image side has an aspheric shape. Since the fourth lens L21 is formed as a concavo-concave lens whose face on the image side has an aspheric shape, the magnification chromatic aberration in a wide angle range and the comatic aberration in a telephoto range can be corrected efficiently.

The third lens group G3 includes a seventh lens L31 having a positive refracting power.

The third lens group G3 has a position fixed in the direction of the optical axis upon zooming.

The fourth lens group G4 includes a cemented lens including an eighth lens L41 having a positive refracting power and a ninth lens L42 having a negative refracting power and cemented to the eighth lens L41.

The fourth lens group G4 is moved from the image side toward the object side upon zooming from the wide angle end toward the telephoto end and is movable along the optical direction also upon focusing.

The fifth lens group G5 includes a tenth lens L51 having a negative refracting power, an eleventh lens or first positive lens L52 having a positive refracting power and movable in a direction perpendicular to the optical axis to shift an image, and a twelfth lens L53 having a negative refracting power. The tenth lens L51, eleventh lens L52 and twelfth lens L53 are disposed in order from the object side toward the image side.

The tenth lens L51 of the fifth lens group G5 is formed as a concavo-concave lens. Since the tenth lens L51 is formed as a concavo-concave lens, appearance of the magnification chromatic aberration in the wide angle range can be suppressed.

The twelfth lens L53 of the fifth lens group G5 has an aspheric face. Since the twelfth lens L53 has an aspheric face, the curvature of field particularly in the wide angle region can be corrected effectively and the variation of the aberrations when the eleventh lens L52 moves in a direction perpendicular to the optical axis can be suppressed.

The eleventh lens L52 of the fifth lens group G5 is formed from a resin material. Since the eleventh lens L52 is formed from a resin material, reduction of the cost can be achieved and movement of the eleventh lens L52 in the direction perpendicular to the optical axis can be facilitated by reduction of the weight.

The aperture IR is disposed in the proximity of and on the image side of the third lens group G3.

Lens data of the numerical value example 4 where particular numerical values are applied to the zoom lens 4 of the fourth embodiment are indicated in Table 10 together with the F number Fno and a half angle ω of view in a wide angle end state (F=5.17), an intermediate focal length state (F=9.06) and a telephoto end state (F=15.89).

TABLE 10

F = 5.17~9.06~15.89
Fno = 3.5~3.7~4.2
ω = 38.7°~23.3°~13.8°

| si | | ri | di | ni | vi | DIAi |
|---|---|---|---|---|---|---|
| 1 | Aspheric | 32.000 | 0.80 | 1.9229 | 20.8 | 5.30 |
| 2 | Aspheric | 8.559 | 2.10 | | | 4.64 |
| 3 | (Prism) | ∞ | 7.00 | 1.9037 | 31.3 | 4.53 |
| 4 | | ∞ | 0.25 | | | 4.03 |
| 5 | Aspheric | 9.775 | 2.00 | 1.6935 | 53.2 | 3.90 |
| 6 | Aspheric | −16.192 | d6 | | | 3.90 |
| 7 | | −16.089 | 0.42 | 1.8513 | 40.1 | 2.36 |
| 8 | Aspheric | 6.786 | 0.77 | | | 2.12 |
| 9 | | −15.184 | 0.40 | 1.8830 | 40.8 | 2.05 |
| 10 | | 9.100 | 0.85 | 1.9459 | 17.9 | 2.08 |
| 11 | | −131.370 | d11 | | | 2.12 |
| 12 | Aspheric | 10.430 | 1.32 | 1.6226 | 58.1 | 2.35 |
| 13 | Aspheric | −19.421 | 0.20 | | | 2.30 |
| 14 | (Aperture) | ∞ | 1.50 | | | 2.25 |
| 15 | | ∞ | d15 | | | 2.57 |
| 16 | Aspheric | 13.985 | 2.30 | 1.6226 | 58.1 | 3.08 |
| 17 | | −5.644 | 0.40 | 1.7618 | 26.6 | 3.06 |
| 18 | | −11.536 | d18 | | | 3.10 |
| 19 | | −17.110 | 0.42 | 2.0006 | 25.45 | 2.94 |
| 20 | | 24.332 | 1.55 | | | 3.00 |
| 21 | | 8.997 | 1.90 | 1.4875 | 70.4 | 3.61 |

TABLE 10-continued

F = 5.17~9.06~15.89
Fno = 3.5~3.7~4.2
ω = 38.7°~23.3°~13.8°

| si | | ri | di | ni | vi | DIAi |
|---|---|---|---|---|---|---|
| 22 | | −19.026 | 3.50 | | | 3.63 |
| 23 | Aspheric | −19.402 | 0.80 | 1.5250 | 56.5 | 3.47 |
| 24 | | −100.000 | 1.80 | | | 3.60 |
| 25 | | ∞ | 0.50 | 1.5567 | 58.5 | 3.85 |
| 26 | | ∞ | 1.00 | | | 3.89 |

Upon zooming between the wide angle end state and the telephoto end state of the zoom lens 4, the face distance d6 between the first lens group G1 and the second lens group G2, the face distance d11 between the second lens group G2 and the third lens group G3, the face distance d15 between the aperture IR and the fourth lens group G4 and the face distance d18 between the fourth lens group G4 and the fifth lens group G5 vary. The variation distances in the wide angle end state, intermediate focal length state and telephoto end state of the face distances in the numerical value example 4 are indicated in Table 11.

TABLE 11

| F | 5.17 | 9.06 | 15.89 |
|---|---|---|---|
| d6 | 0.41 | 3.46 | 5.73 |
| d11 | 5.73 | 2.68 | 0.41 |
| d15 | 6.19 | 3.87 | 1.66 |
| d18 | 2.14 | 4.46 | 6.67 |

In the zoom lens 4, the opposite faces of the first lens L11 of the first lens group G1, that is, the first and second faces, the opposite faces of the third lens L13 of the first lens group G1, that is, the fifth and sixth faces, the image side face of the fourth lens L21 of the second lens group G2, that is, the eighth face, the opposite faces of the seventh lens L31 of the third lens group G3, that is, the twelfth and thirteenth faces, the object side face of the eighth lens L41 of the fourth lens group G4, that is, the sixteenth face, and the object side face of the twelfth lens L53 of the fifth lens group G5, that is, the 23rd face, are formed as an aspheric face. The fourth-, sixth-, eighth- and tenth-order aspheric face coefficients A4, A6, A8 and A10 of the aspheric faces in the numerical value example 4 are indicated in Table 12 together with the conic constant K.

TABLE 12

| | s1 | s2 | s5 | s6 | s8 | s12 |
|---|---|---|---|---|---|---|
| K | 0 | 0 | 0 | 0 | 0 | 0 |
| A4 | −4.4101E−04 | −5.6994E−04 | −2.7570E−04 | −1.4209E−05 | −5.3807E−04 | −3.0447E−04 |
| A6 | 1.3478E−05 | 1.4410E−05 | −1.5112E−07 | 1.8223E−06 | −5.6838E−06 | 9.6410E−06 |
| A8 | −1.2189E−07 | −4.2377E−09 | −3.8112E−08 | −1.2238E−07 | 6.7914E−08 | −2.2452E−07 |
| A10 | 0.0000E+00 | 0.0000E+00 | −1.1584E−09 | 1.1825E−09 | 0.0000E+00 | 1.2719E−08 |

| | s13 | s16 | s23 |
|---|---|---|---|
| K | 0 | 0 | 0 |
| A4 | −1.0354E−06 | −2.2458E−04 | −1.3449E−03 |
| A6 | 8.1909E−06 | 3.4613E−06 | 3.2639E−05 |
| A8 | −5.4551E−21 | −1.9374E−07 | −2.8825E−06 |
| A10 | 3.2401E−21 | 8.6023E−09 | 8.5555E−08 |

Figure 14:
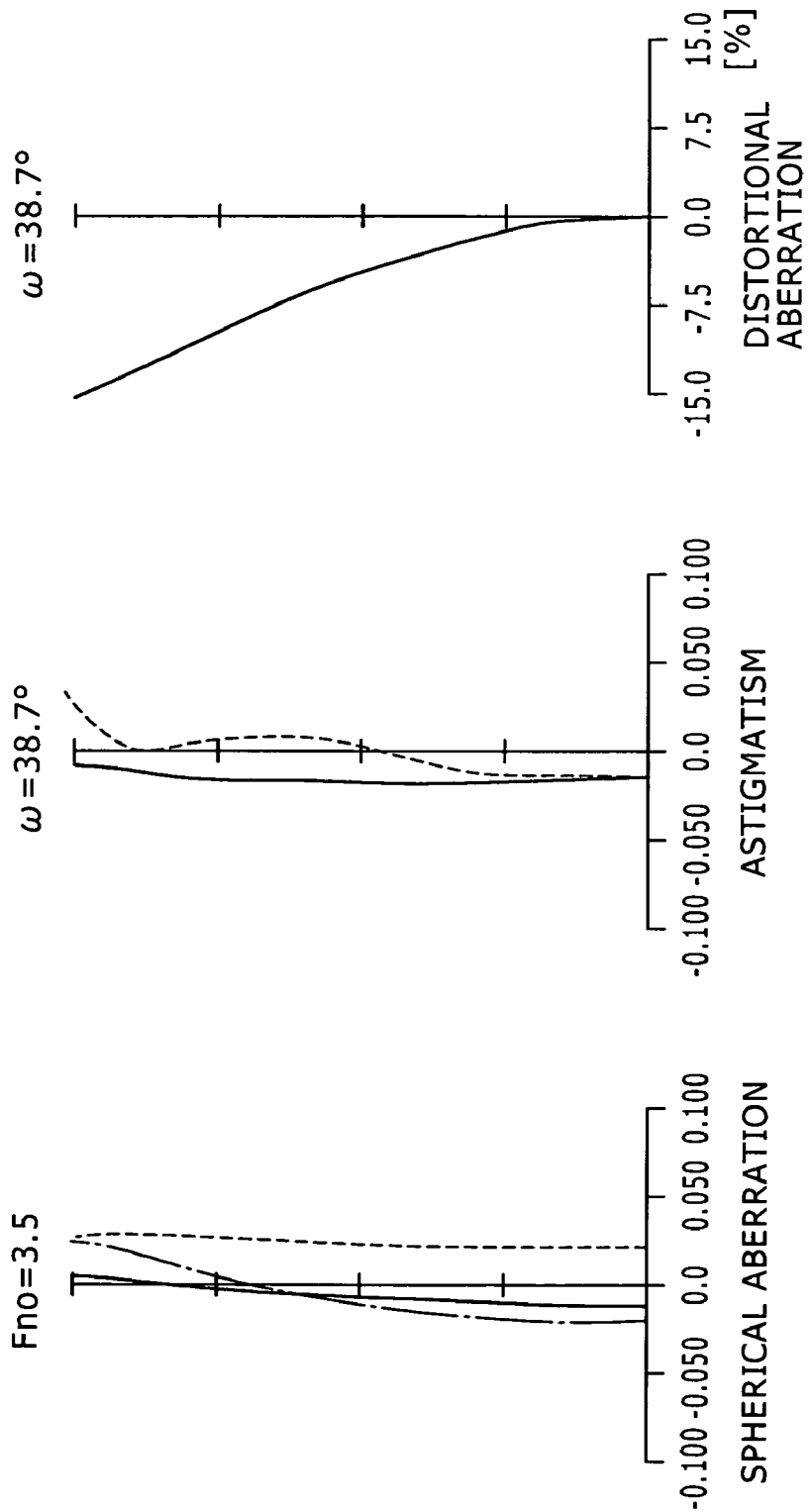
FIG. 14 is a diagrammatic view illustrating a spherical aberration, an astigmatism and a distortional aberration in a wide angle end state of the zoom lens of FIG. 13 according to a still further numerical value example wherein particular numerical values are applied to the zoom lens.
Figure 15:
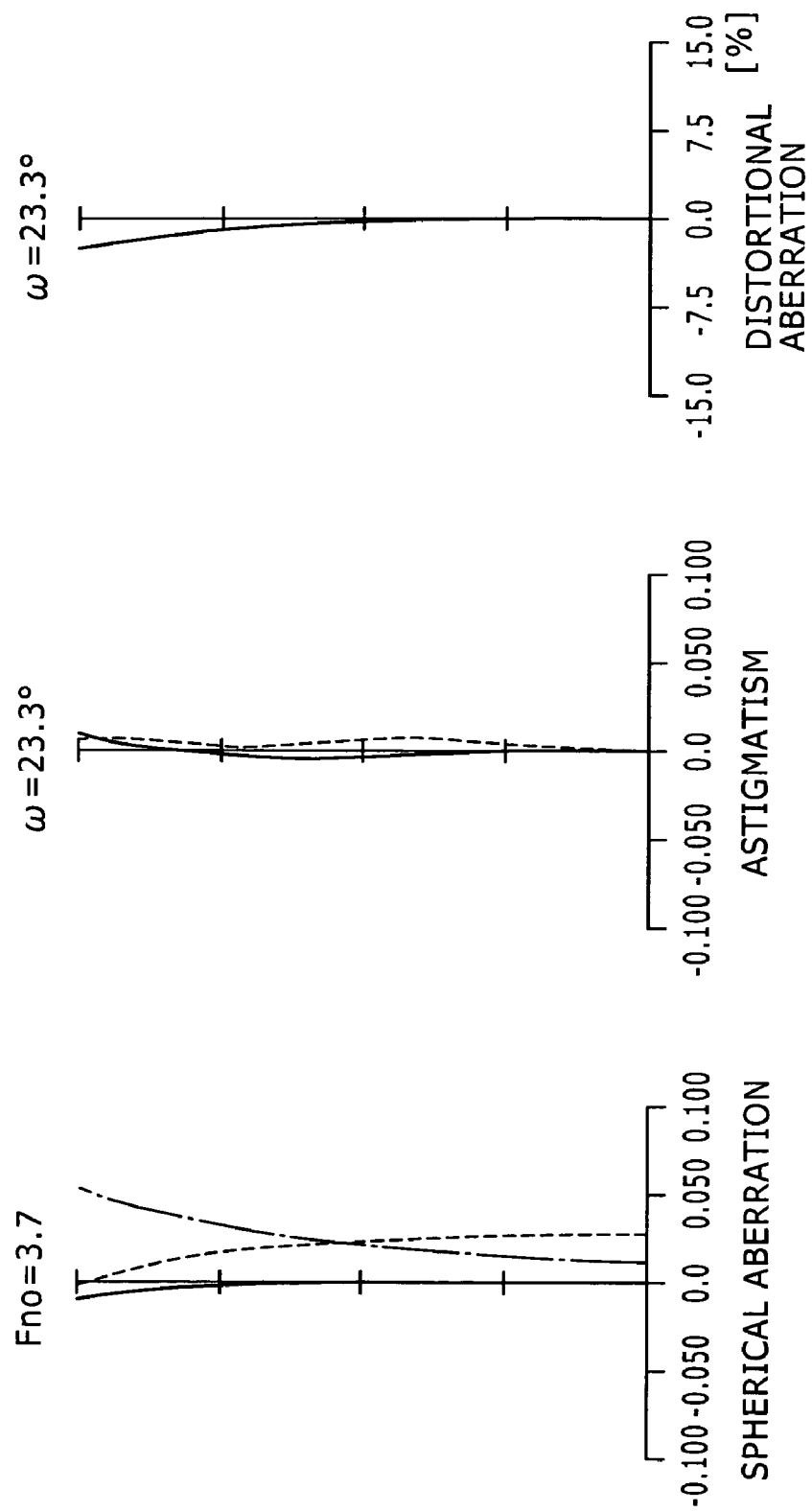
FIG. 15 is a similar view but illustrating a spherical aberration, an astigmatism and a distortional aberration in an intermediate focal length state of the zoom lens of FIG. 13 according to the same numerical value example.
Figure 16:
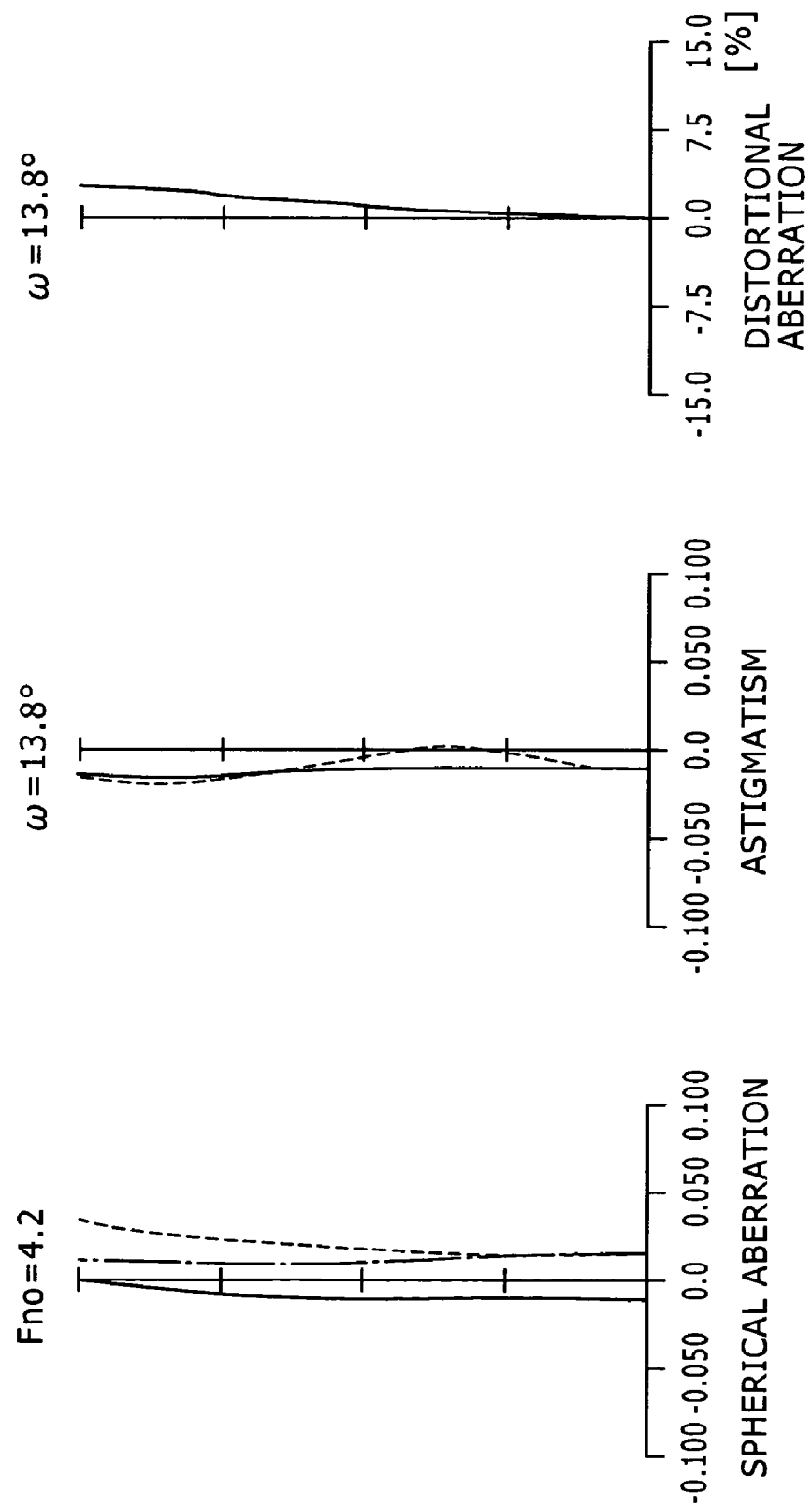
FIG. 16 is a similar view but illustrating a spherical aberration, an astigmatism and a distortional aberration in a telephoto end state of the zoom lens of the zoom lens of FIG. 13 according to the same numerical value example.

FIGS. 14 to 16 illustrate several aberrations in an infinitely focused state of the numerical value example 4. More particularly, FIGS. 14, 15 and 16 illustrate a spherical aberration, an astigmatism and a distortional aberration in the wide angle end state, intermediate focal length state and telephoto end state, respectively.

In FIGS. 14 to 16, for the spherical aberration, a solid line indicates the spherical aberration with regard to the d-line (wavelength 587.6 nm); an alternate long and short dash line indicates the spherical aberration with regard to the g-line (wavelength 435.8 nm); and a broken line indicates the spherical aberration with regard to the C-line (wavelength 656.3 nm). For the astigmatism, a solid line indicates values of the astigmatism on a sagittal image surface while a broken line indicates values of the astigmatism on a meridional image surface.

From the views of the aberrations, it can be recognized apparently that the numerical value example 4 has a superior image forming performance with the various aberrations corrected favorably.

Fifth Embodiment

Figure 17:
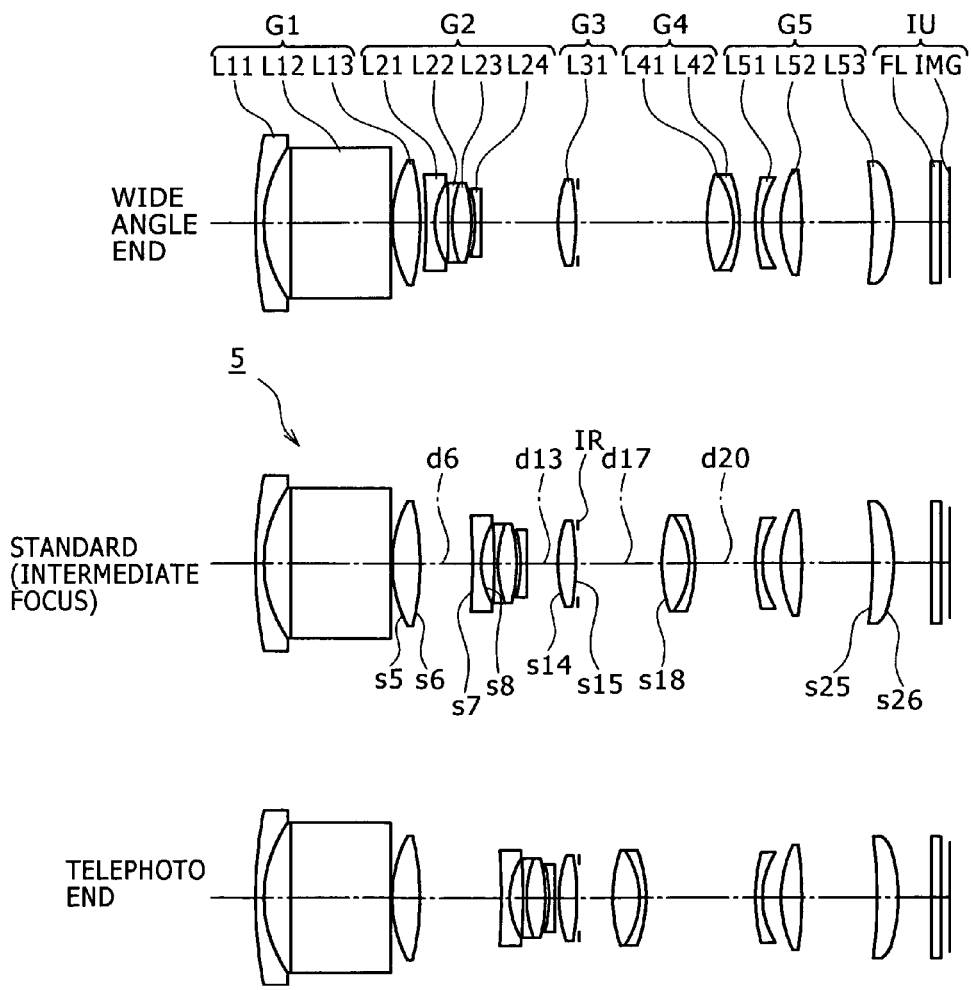
FIG. 17 is a schematic view showing a lens configuration of a zoom lens according to a fifth embodiment of the present invention.

FIG. 17 shows a lens configuration of a zoom lens 5 according to a fifth embodiment of the present invention.

Referring to FIG. 17, the zoom lens 5 shown has a magnification ratio of 3.73 times.

The zoom lens 5 includes a first lens group G1 having a positive refracting power, a second lens group G2 having a negative refracting power, a third lens group G3 having a positive refracting power, a fourth lens group G4 having a positive refracting power, and a fifth lens group G5 having a negative refracting power. The first lens group G1, second lens group G2, third lens group G3, fourth lens group G4 and fifth lens group G5 are disposed in order from the object side toward the image side.

The first lens group G1 includes a first lens or front side lens L11 having a negative refracting power, a prism L12 serving as an optical member for bending the optical axis by 90°, and a third lens or rear side lens L13 having a positive refracting power. The first lens L11, prism L12 and third lens L13 are disposed in order from the object side toward the image side.

The first lens group G1 has a position fixed in the direction of the optical axis upon zooming. Since the prism L12 is disposed in the first lens group G1 to bend the optical axis by 90°, reduction in thickness of the image pickup apparatus and the zoom lens in the thicknesswise direction can be anticipated.

The second lens group G2 includes a fourth lens L21 having a negative refracting power, a cemented lens including a fifth lens L22 having a negative refracting power and a sixth lens L23 having a positive refracting power and cemented to the fifth lens L22, and a seventh lens L24 having a negative refracting power. The fourth lens L21, the cemented lens of the fifth lens L22 and the sixth lens L23, and the seventh lens L24 are disposed in order from the object side toward the image side.

The second lens group G2 is moved from the object side toward the image side upon zooming from the wide angle end toward the telephoto end.

The fourth lens L21 of the second lens group G2 is a concavo-concave lens whose faces on the object side and the image side have an aspheric shape. Since the fourth lens L21 is formed as a concavo-concave lens whose face on the image side has an aspheric shape, the magnification chromatic aberration in a wide angle range and the comatic aberration in a telephoto range can be corrected efficiently.

The third lens group G3 includes an eighth lens L31 having a positive refracting power.

The third lens group G3 has a position fixed in the direction of the optical axis upon zooming.

The fourth lens group G4 includes a cemented lens including a ninth lens L41 having a positive refracting power and a tenth lens L42 having a negative refracting power and cemented to the ninth lens L41.

The fourth lens group G4 is moved from the image side toward the object side upon zooming from the wide angle end toward the telephoto end and is movable along the optical direction also upon focusing.

The fifth lens group G5 includes an eleventh lens L51 having a negative refracting power, a twelfth lens or first positive lens L52 having a positive refracting power and movable in a direction perpendicular to the optical axis, and a thirteenth lens or second positive lens L53 having a positive refracting power. The eleventh lens L51, twelfth lens L52 and thirteenth lens L53 are disposed in order from the object side toward the image side.

The thirteenth lens L53 of the fifth lens group G5 has an aspheric face. Where the thirteenth lens L53 has an aspheric face, the curvature of field in the wide angle region can be corrected effectively and the variation of the aberrations when the twelfth lens L52 is moved in the direction perpendicular to the optical axis can be suppressed.

The thirteenth lens L53 of the fifth lens group G5 is formed from a resin material. Since the thirteenth lens L53 is formed from a resin material, reduction of the cost can be anticipated.

The aperture IR is disposed in the proximity of and on the image side of the third lens group G3.

Lens data of the numerical value example 5 where particular numerical values are applied to the zoom lens 5 of the fifth embodiment are indicated in Table 13 together with the F number Fno and a half angle ω of view in a wide angle end state (F=5.20), an intermediate focal length state (F=10.00) and a telephoto end state (F=19.40).

TABLE 13

F = 5.20~10.00~19.40
Fno = 3.6~3.9~5.2
ω = 37.9°~20.7°~10.9°

| si | | ri | di | ni | vi | DIAi |
|---|---|---|---|---|---|---|
| 1 | | 39.941 | 0.60 | 1.9229 | 20.8 | 5.75 |
| 2 | | 9.453 | 2.00 | | | 5.05 |
| 3 | (Prism) | ∞ | 7.40 | 1.9037 | 31.3 | 4.91 |
| 4 | | ∞ | 0.20 | | | 4.13 |
| 5 | Aspheric | 9.619 | 1.94 | 1.6935 | 53.2 | 4.00 |
| 6 | Aspheric | −17.603 | d6 | | | 3.94 |
| 7 | Aspheric | −50.000 | 0.60 | 1.8513 | 40.1 | 2.82 |
| 8 | Aspheric | 5.181 | 0.85 | | | 2.38 |
| 9 | | −49.641 | 0.40 | 1.8830 | 40.8 | 2.31 |
| 10 | | 7.076 | 1.45 | 1.8467 | 23.7 | 2.21 |
| 11 | | −8.681 | 0.30 | | | 2.11 |
| 12 | | −5.454 | 0.40 | 1.8830 | 40.8 | 2.02 |

TABLE 13-continued

F = 5.20~10.00~19.40
Fno = 3.6~3.9~5.2
ω = 37.9°~20.7°~10.9°

| si | | ri | di | ni | vi | DIAi |
|---|---|---|---|---|---|---|
| 13 | | −59.741 | d13 | | | 2.00 |
| 14 | Aspheric | 10.498 | 1.32 | 1.5831 | 59.4 | 2.59 |
| 15 | Aspheric | −12.444 | 0.18 | | | 2.55 |
| 16 | (Aperture) | ∞ | 1.30 | | | 2.50 |
| 17 | | ∞ | d17 | | | 2.67 |
| 18 | Aspheric | 12.302 | 2.00 | 1.5831 | 59.4 | 2.98 |
| 19 | | −5.500 | 0.40 | 1.7174 | 26.5 | 2.94 |
| 20 | | −11.578 | d20 | | | 2.95 |
| 21 | | 18.683 | 0.40 | 2.0006 | 25.45 | 2.80 |

In the zoom lens 5, the opposite faces of the third lens L13 of the first lens group G1, that is, the fifth and sixth faces, the opposite faces of the fourth lens L21 of the second lens group G2, that is, the seventh and eighth faces, the opposite faces of the eighth lens L31 of the third lens group G3, that is, the fourteenth and fifteenth faces, the object side face of the ninth lens L41 of the fourth lens group G4, that is, the eighteenth face, and the opposite faces of the thirteenth lens L53 of the fifth lens group G5, that is, the 25th and 26th faces are formed as an aspheric face. The fourth-, sixth-, eighth- and tenth-order aspheric face coefficients A4, A6, A8 and A10 of the aspheric faces in the numerical value example 5 are indicated in Table 15 together with the conic constant K.

TABLE 15

| | s5 | s6 | s7 | s8 | s14 | s15 |
|---|---|---|---|---|---|---|
| K | −0.901 | −0.872 | 0.000 | 0.000 | 0.309 | −1.828 |
| A4 | −1.2047E−05 | 1.0060E−04 | 5.8569E−04 | −6.8168E−04 | −9.7309E−05 | 3.0414E−04 |
| A6 | 9.4174E−07 | 3.4153E−07 | 1.0981E−06 | 2.9119E−05 | 7.2718E−05 | 7.6944E−05 |
| A8 | −1.2204E−07 | −1.3464E−07 | −1.6744E−06 | −5.7788E−06 | −2.6299E−06 | −4.7384E−06 |
| A10 | 3.4740E−09 | 4.3709E−09 | 1.0015E−07 | 2.5139E−07 | 8.5412E−07 | 1.1493E−06 |

| | s18 | s25 | s26 |
|---|---|---|---|
| K | 0.192 | 52.877 | 0.000 |
| A4 | −1.9239E−04 | 1.6956E−03 | 2.1921E−03 |
| A6 | 4.2909E−06 | −8.4825E−05 | −1.3578E−04 |
| A8 | −7.7217E−08 | −2.0444E−07 | 3.1535E−07 |
| A10 | 6.0381E−09 | 0.0000E+00 | 0.0000E+00 |

TABLE 13-continued

F = 5.20~10.00~19.40
Fno = 3.6~3.9~5.2
ω = 37.9°~20.7°~10.9°

| si | | ri | di | ni | vi | DIAi |
|---|---|---|---|---|---|---|
| 22 | | 5.508 | 1.45 | | | 2.70 |
| 23 | | 8.692 | 1.50 | 1.4875 | 70.4 | 3.23 |
| 24 | | −32.080 | 5.24 | | | 3.30 |
| 25 | Aspheric | −31.353 | 1.50 | 1.5250 | 56.5 | 3.78 |
| 26 | Aspheric | −12.766 | 3.00 | | | 3.97 |
| 27 | | ∞ | 0.50 | 1.5567 | 58.5 | 3.87 |
| 28 | | ∞ | 0.60 | | | 3.87 |

Upon zooming between the wide angle end state and the telephoto end state of the zoom lens 5, the face distance d6 between the first lens group G1 and the second lens group G2, the face distance d13 between the second lens group G2 and the third lens group G3, the face distance d17 between the aperture IR and the fourth lens group G4 and the face distance d20 between the fourth lens group G4 and the fifth lens group G5 vary. The variation distances in the wide angle end state, intermediate focal length state and telephoto end state of the face distances in the numerical value example 5 are indicated in Table 14.

TABLE 14

| F | 5.20 | 10.00 | 19.40 |
|---|---|---|---|
| d6 | 0.42 | 3.79 | 5.83 |
| d13 | 5.83 | 2.45 | 0.42 |
| d17 | 8.11 | 4.60 | 0.84 |
| d20 | 1.20 | 4.71 | 8.47 |

Figure 18:
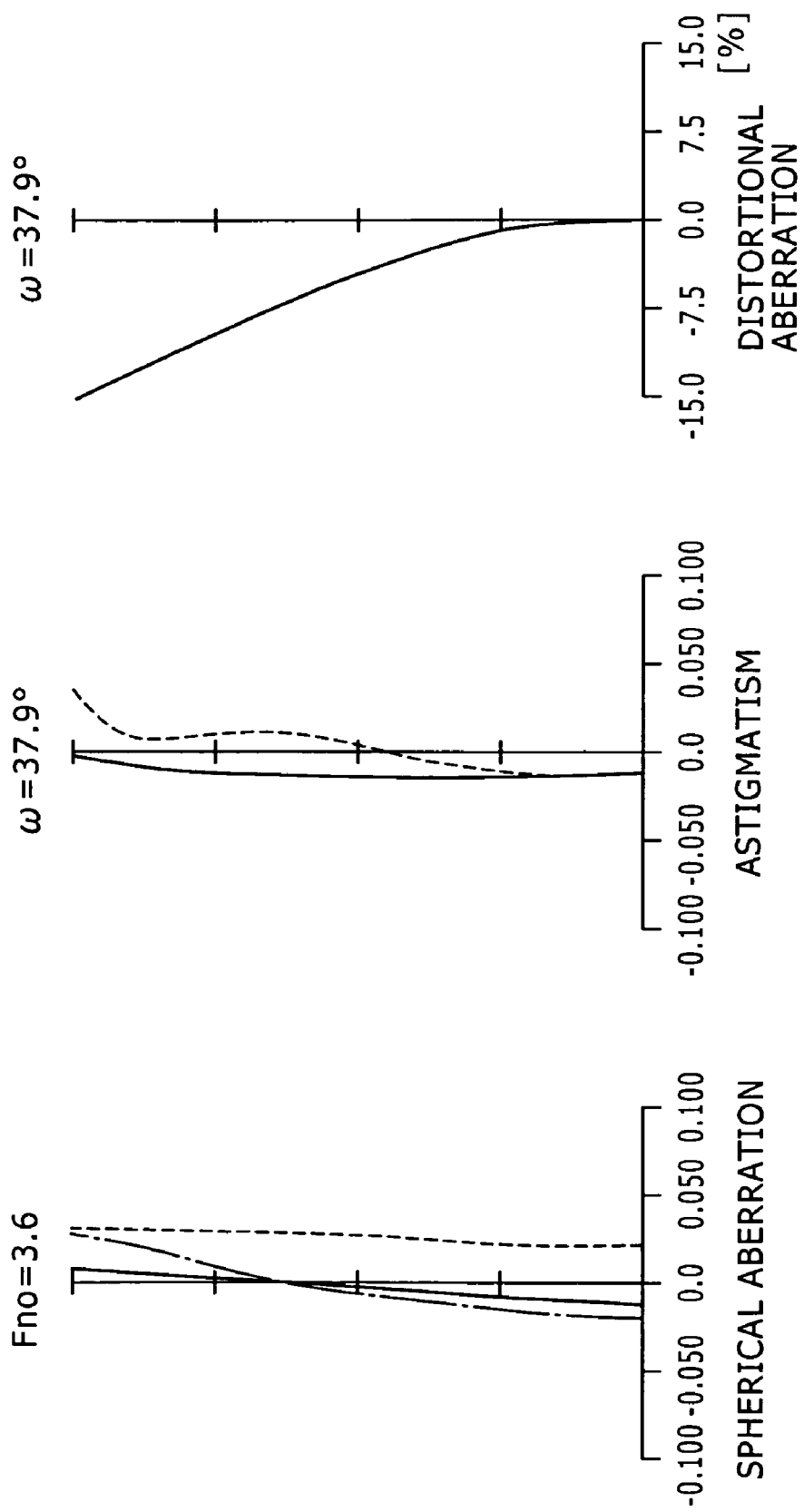
FIG. 18 is a diagrammatic view illustrating a spherical aberration, an astigmatism and a distortional aberration in a wide angle end state of the zoom lens of FIG. 17 according to a yet further numerical value example wherein particular numerical values are applied to the zoom lens.
Figure 19:
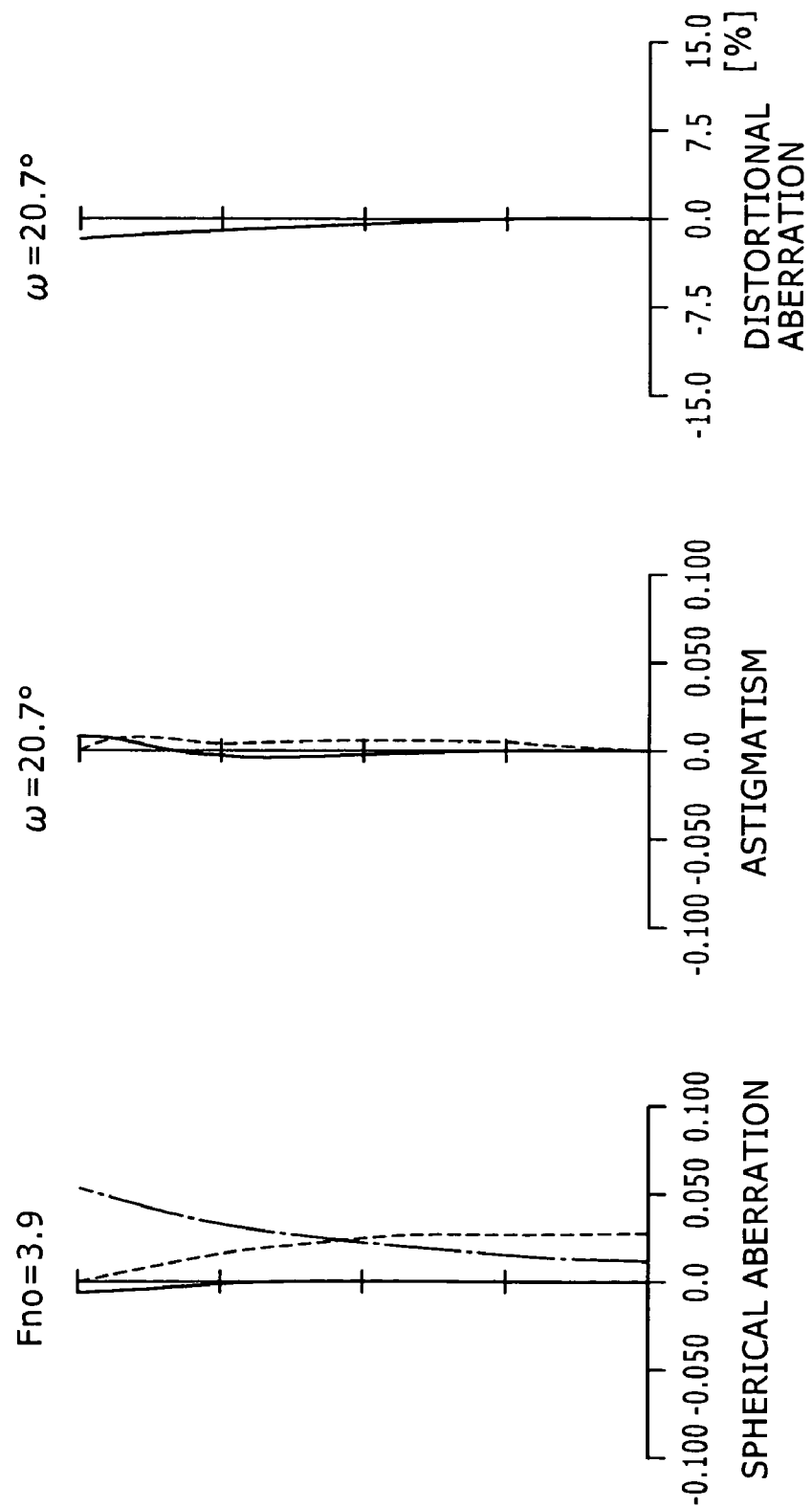
FIG. 19 is a similar view but illustrating a spherical aberration, an astigmatism and a distortional aberration in an intermediate focal length state of the zoom lens of FIG. 17 according to the same numerical value example.
Figure 20:
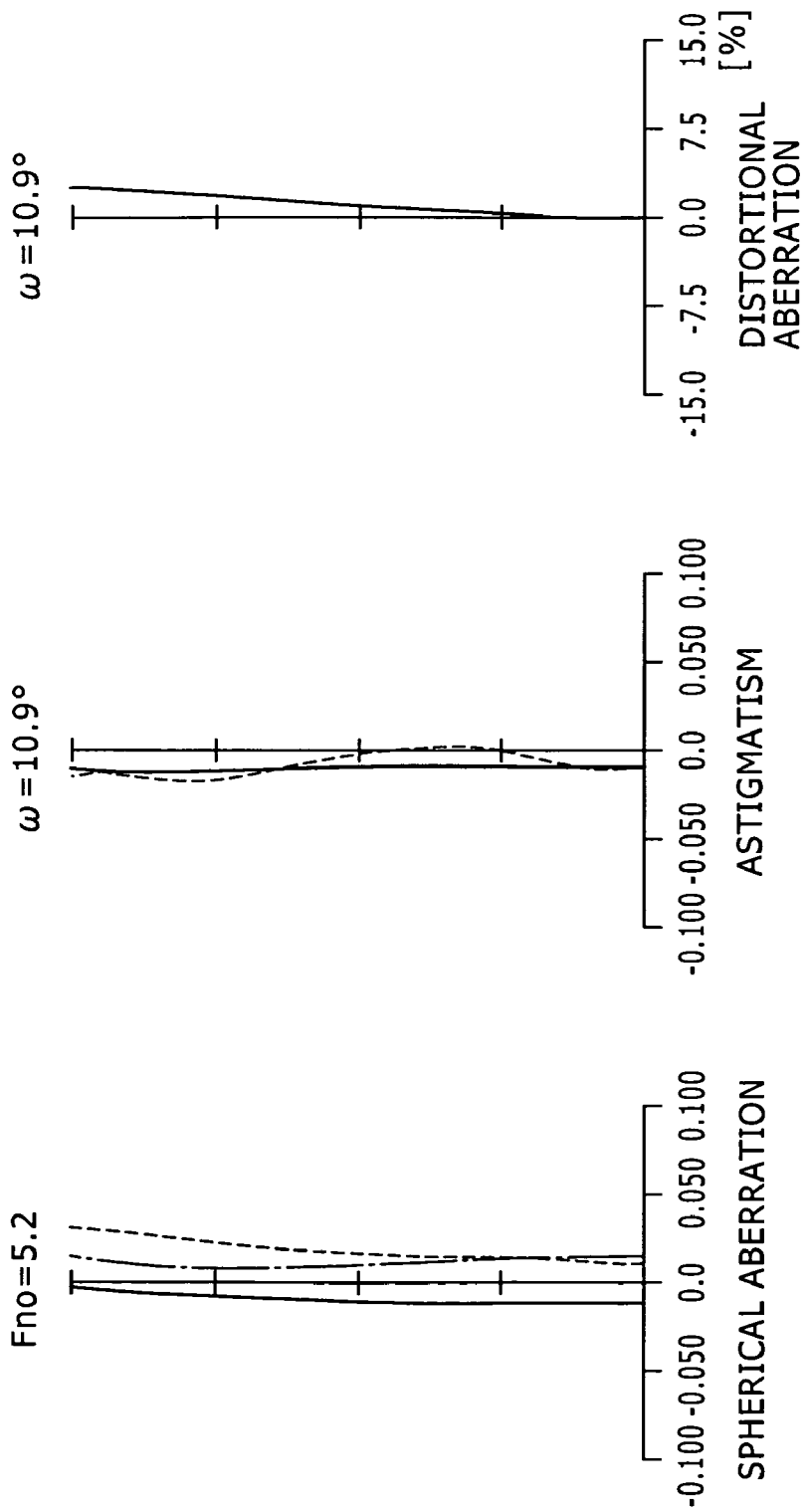
FIG. 20 is a similar view but illustrating a spherical aberration, an astigmatism and a distortional aberration in a telephoto end state of the zoom lens of the zoom lens of FIG. 17 according to the same numerical value example.

FIGS. 18 to 20 illustrate several aberrations in an infinitely focused state of the numerical value example 5. More particularly, FIGS. 18, 19 and 20 illustrate a spherical aberration, an astigmatism and a distortional aberration in the wide angle end state, intermediate focal length state and telephoto end state, respectively.

In FIGS. 18 to 20, for the spherical aberration, a solid line indicates the spherical aberration with regard to the d-line (wavelength 587.6 nm); an alternate long and short dash line indicates the spherical aberration with regard to the g-line (wavelength 435.8 nm); and a broken line indicates the spherical aberration with regard to the C-line (wavelength 656.3 nm). For the astigmatism, a solid line indicates values of the astigmatism on a sagittal image surface while a broken line indicates values of the astigmatism on a meridional image surface.

From the views of the aberrations, it can be recognized apparently that the numerical value example 5 has a superior image forming performance with the various aberrations corrected favorably.

Values of Conditional Expressions for the Zoom Lens

In the following, various values of the conditional expressions of the zoom lens according to embodiments of the present invention are described.

Various values of the conditional expressions (1) to (11) given hereinabove of the zoom lenses 1 to 5 are indicated in Table 16.

TABLE 16

|  |  | Embodiment 1 | Embodiment 2 | Embodiment 3 | Embodiment 4 | Embodiment 5 |
|---|---|---|---|---|---|---|
|  | F1 | 11.60 | 11.92 | 11.37 | 11.49 | 11.64 |
|  | FW | 5.18 | 4.61 | 4.59 | 5.18 | 5.20 |
| Conditional expression (1) | F1/FW | 2.24 | 2.59 | 2.48 | 2.22 | 2.24 |
|  | D1G | 12.35 | 12.75 | 12.83 | 12.15 | 12.14 |
| Conditional expression (2) | D1G/FW | 2.39 | 2.77 | 2.80 | 2.35 | 2.33 |
|  | DIA11 | 5.63 | 5.82 | 5.61 | 5.30 | 5.75 |
|  | DIA21 | 2.33 | 2.47 | 2.38 | 2.36 | 2.82 |
| Conditional expression (3) | DIA11/DIA21 | 2.42 | 2.36 | 2.36 | 2.25 | 2.04 |
|  | FG1 | −15.45 | −12.06 | −12.67 | −12.73 | −13.40 |
| Conditional expression (4) | |FG1/FW| | 2.98 | 2.62 | 2.76 | 2.46 | 2.58 |
|  | FRW | 9.52 | 9.92 | 9.68 | 9.46 | 9.64 |
| Conditional expression (5) | FRW/FW | 1.84 | 2.15 | 2.11 | 1.83 | 1.85 |
|  | D2 | 5.32 | 5.75 | 5.50 | 5.32 | 5.41 |
|  | D4 | 6.26 | 6.32 | 6.42 | 4.53 | 7.27 |
| Conditional expression (6) | |D4/D2| | 1.18 | 1.10 | 1.17 | 0.85 | 1.34 |
|  | F2 | −3.60 | −4.27 | −3.76 | −4.36 | −3.57 |
| Conditional expression (7) | |F2/FW| | 0.69 | 0.93 | 0.82 | 0.84 | 0.69 |
|  | F4 | 11.50 | 11.48 | 11.21 | 12.05 | 12.13 |
| Conditional expression (8) | F4/FW | 2.22 | 2.49 | 2.44 | 2.33 | 2.33 |
| Conditional expression (9) | β 52 | 0.30 | 0.42 | 0.40 | 0.39 | 0.21 |
| Conditional expression (10) | β 53 | 0.73 | 0.95 | 0.84 | 1.08 | 0.92 |
|  | F5 | 1945.3 | −245.5 | −961.6 | −30.1 | −248.8 |
| Conditional expression (11) | FW/F5 | 0.00 | −0.02 | 0.00 | −0.17 | −0.02 |

As can be recognized apparently from Table 16, the zoom lenses 1 to 5 satisfy the conditional expressions (1) to (11).

Configuration of the Image Pickup Apparatus

In the following, an image pickup apparatus to which an embodiment of the present invention is applied is described.

The image pickup apparatus includes a zoom lens, and an image pickup element for converting an optical image formed by the zoom lens into an electric signal.

More particularly, the image pickup apparatus includes a zoom lens, and an image pickup element for converting an optical image formed by the zoom lens into an electric signal. The zoom lens includes a first lens group having a positive refracting power, a second lens group having a negative refracting power, a third lens group having a positive refracting power, a fourth lens group having a positive refracting power, and a fifth lens group having a positive or negative refracting power, disposed in order from the object side to the image side.

In the zoom lens of the image pickup apparatus, the second lens group and the fourth lens group are moved in the direction of an optical axis upon zooming.

In the zoom lens of the image pickup apparatus, the first lens group has a position fixed in the direction of the optical axis upon zooming. In the first lens group, a front side lens having a negative refracting power, an optical member for bending an optical path and a rear side lens having a positive refracting power are disposed in order from the object side to the image side.

In addition, in the zoom lens of the image pickup apparatus, the third lens group has a position fixed in the direction of the optical axis upon zooming, and the aperture is disposed between the second lens group and the third lens group or between the third lens group and the fourth lens group in such a manner as to satisfy the following conditional expressions (1), (2) and (3):

$$1.8 < F1/FW < 3.0 \quad (1)$$

$$2.0 < D1G/FW < 3.3 \quad (2)$$

$$2.0 < DIA11/DIA21 < 3.0 \quad (3)$$

where

F1: focal length of the first lens group

D1G: thickness of the first lens group on the optical axis

FW: focal length of the entire lens system at the wide angle end

DIA11: effective diameter of the lens surface on the most object side of the first lens at the wide angle end DIA21: effective diameter of the lens surface on the most object side of the second lens at the wide angle end.

Since the zoom lens of the image pickup apparatus is configured in such a manner as described above, the following advantages can be achieved.

The directions of movement of the second lens group and the fourth lens group when zooming is carried out coincide with the direction of the optical axis of the rear side lens of the first lens group, that is, the direction of the optical path after it is bent by the optical member. Consequently, reduction of the thickness of the lens system can be achieved.

Further, since the aperture is disposed between the second lens group and the third lens group or between the third lens group and the fourth lens group, the aperture can be disposed in the proximity of the center of the five-group zoom configuration. Consequently, the effective diameter of the zoom lens from the first lens group to the fifth lens group can be reduced and reduction of the thickness of the lens system can be anticipated.

The conditional expression (1) defines the focal length of the first lens group. By appropriately defining the focal length of the first lens group, a zoom lens of a small size which is less likely to suffer from appearance of the off-axis aberration at the wide angle end can be implemented while it is a wide angle zoom lens.

If the focal length of the first lens group becomes smaller than the lower limit of the conditional expression (1), then since it is excessively small, the refracting power of the rear side lens of the first lens group becomes excessively high. Consequently, the magnification chromatic aberration increases at the wide angle end side while the on-axis chromatic aberration increases on the telephoto end side. Further, where the front side lens and the rear side lens have fixed refracting powers, the distance between the front side lens and the rear side lens on the optical axis increases, resulting in difficulty in reduction of the thickness of the optical system.

On the contrary, if the focal length of the first lens group becomes greater than the upper limit of the conditional expression (1), then since the focal length of the first lens group becomes excessively great, it becomes necessary to assure a great amount of movement of the second lens group for magnification, resulting in increase of the distance between the first lens group and the third lens group. Further, if the distance from the front side lens of the first lens group to the aperture increases, then the entrance pupil position is spaced away from the front side lens toward the image side. Therefore, if the angle of view is increased, then the diameter of the front side lens and the optical member becomes great, and this makes an obstacle to reduction in thickness.

The conditional expression (2) defines the thickness of the first lens group, which includes the optical member for bending the optical axis, on the optical axis. If the focal length of the first lens group satisfies the conditional expression (1) and the thickness of the first lens group on the optical axis is defined suitably so as to satisfy the conditional expression (2), then reduction in size and thickness can be anticipated while the zoom lens is of the wide angle type.

If the thickness of the first lens group becomes smaller than the lower limit of the conditional expression (2), since the distance between the front side lens and the rear side lens becomes excessively small, it is difficult to assure a sufficient length for bending the optical path of the optical member. Further, the refracting power of the front side lens or the rear side lens becomes excessively high, and consequently, the magnification chromatic aberration increases at the wide angle end side while the on-axis chromatic aberration increases on the telephoto end side.

On the contrary, if the thickness of the first lens group is greater than the upper limit of the conditional expression (2), then the refracting power of the front side lens becomes excessively low, and consequently, the diameter and the thickness on the optical axis of the front side lens and the optical member become great. Consequently, the thickness of the image pickup apparatus and the zoom lens when the optical path is bent increases, and this makes an obstacle to reduction in thickness.

The conditional expression (3) defines the ratio between the effective diameter of the lens face on the most object side of the first lens group and the effective diameter of the lens face on the most object side of the second lens group. If the ratio between the effective diameter of the lens face on the most object side of the first lens group and the effective diameter of the lens face on the most object side of the second lens group is defined appropriately, then the first lens group can be reduced in size and thickness while the zoom lens is of the wide angle type.

If the ratio between the effective diameters becomes lower than the lower limit of the conditional expression (3), then the effective diameter of the second lens group becomes excessively great, and a light path of a light ray at a maximum angle of view in the second lens group passes a portion spaced far away from the optical axis. Therefore, the thickness of the second lens group on the optical axis becomes great, and it is impossible to sufficiently assure an amount of movement of the second lens group upon zooming. Further, if a light path of a light ray at the maximum angle of view in the second lens group passes a portion spaced away from the optical axis, then the magnification chromatic aberration and the out-axis aberration such as the curvature of field increase. In addition, since also the variation of the aberrations upon zooming becomes great, it becomes difficult to correct the aberrations.

On the contrary, if the ratio between the effective diameter of the lens face on the most object side of the first lens group and the effective diameter of the lens face on the most object side of the second lens group becomes higher than the upper limit of the conditional expression (3), then the effective diameter of the front side lens of the first lens group becomes excessively great and also the effective diameter of the optical member becomes excessively great. Therefore, the thickness of the image pickup apparatus and the zoom lens when the light path is bent increases, resulting in failure to achieve reduction in thickness.

It is to be noted that the conditional expression (1) is modified more preferably such that the lower limit is 2.1 and the upper limit is 2.7. The conditional expression (2) is modified more preferably such that the lower limit is 2.2 and the upper limit is 2.9. The conditional expression (3) is modified more preferably such that the lower limit is 2.1 and the upper limit is 2.6.

Where the conditional expressions (1), (2) and (3) are modified as described above, the advantages described above are enhanced.

Further, where the image pickup apparatus is configured in such a manner as described above, it is possible to set the angle of view of image pickup at the wide angle end of the zoom lens to approximately 70° to 95° and set the magnification ratio to approximately 3 to 6 times.

Form of the Image Pickup Apparatus

Figure 21:
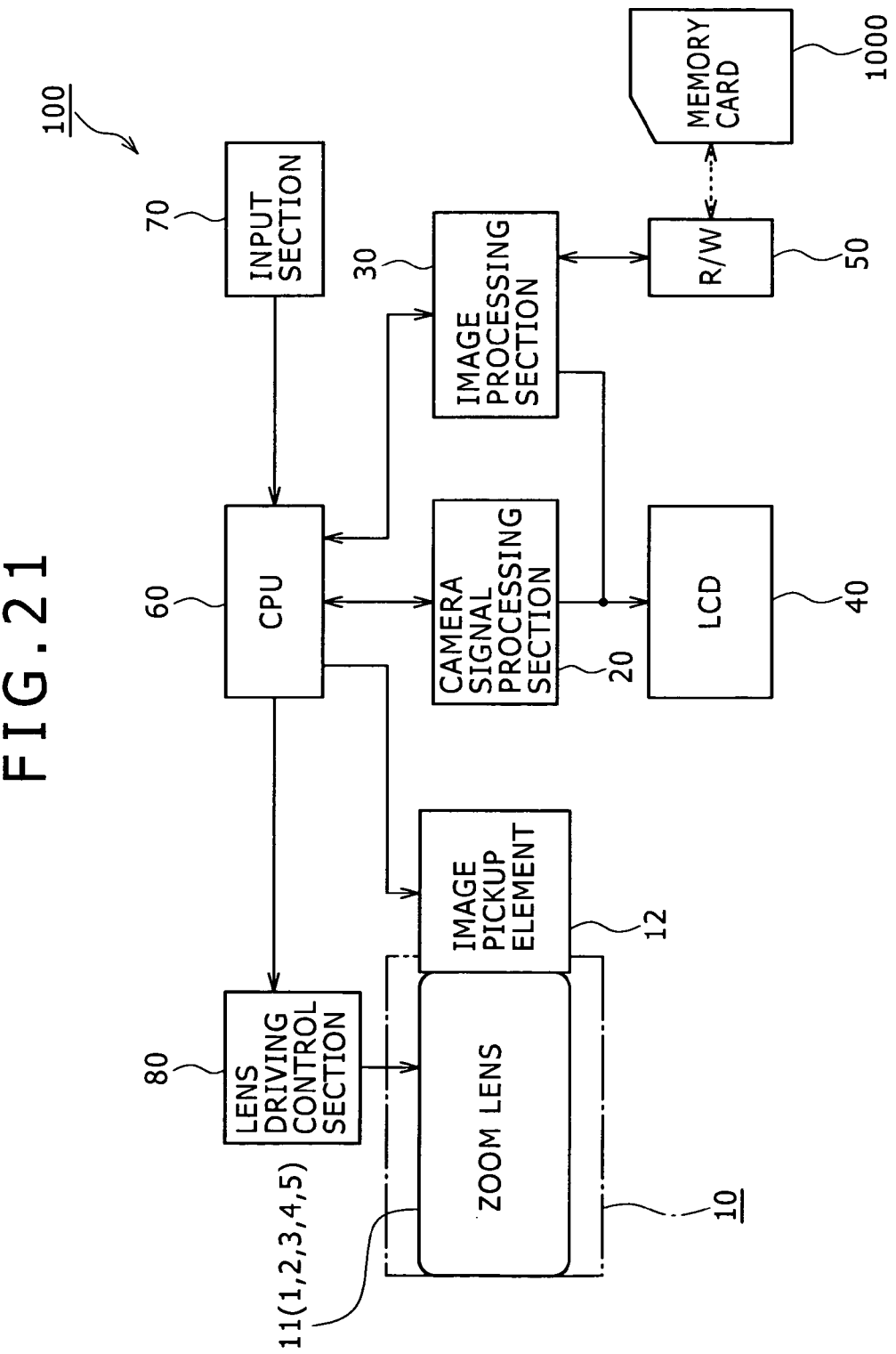
FIG. 21 is a block diagram showing an image pickup apparatus to which an embodiment of the present invention is applied.

A digital still camera which is a form of the image pickup apparatus according to an embodiment of the present invention is shown in block diagram in FIG. 21.

Refer to FIG. 21, the image pickup apparatus 100 in the form of a digital still camera includes a camera block 10 having an image pickup function, a camera signal processing section 20 for carrying out signal processing such as analog to digital conversion of an image signal picked up by the camera block 10, and an image processing section 30 for carrying out recording and reproduction processing of the image signal. The image pickup apparatus 100 further includes an LCD (Liquid Crystal Display) unit 40 for displaying a picked up image and so forth thereon, and a reader/writer (R/W) 50 for writing and reading out of an image signal into and from a memory card 1000. The image pickup apparatus 100 further includes a CPU (Central Processing Unit) 60 for controlling the entire image pickup apparatus, an inputting section 70 including various switches and so forth for being operated by a user, and a lens driving control section 80 for controlling driving of the lenses disposed in the camera block 10.

The camera block 10 includes an optical system including a zoom lens 11 which may be the zoom lens 1, 2, 3, 4 or 5 to which an embodiment of the present invention is applied, an image pickup element 12 such as a CCD (Charge Coupled Device) unit or a CMOS (Complementary Metal-Oxide Semiconductor) unit, and so forth.

The camera signal processing section 20 carries out various signal processes such as conversion into a digital signal, noise removal, picture quality correction and conversion into luminance and color difference signals for an output signal from the image pickup element 12.

The image processing section 30 carries out compression coding and decompression decoding processes of an image signal based on a predetermined image data format, a conversion process of data specifications such as the resolution, and so forth.

The LCD unit 40 has a function of displaying various data such as data representative of an operation state of the inputting section 70 by a user, a picked up image and so forth.

The reader/writer 50 carries out writing of image data encoded by the image processing section 30 into the memory card 1000 and reading out of image data recorded in the memory card 1000.

The CPU 60 functions as a control processing section for controlling the circuit blocks provided in the image pickup apparatus 100 and controls the circuit blocks based on an instruction input signal from the inputting section 70 and so forth.

The inputting section 70 includes, for example, a shutter release button for carrying out a shutter operation, a selection switch for selecting an operation mode, and so forth and outputs an instruction input signal representative of an operation by the user to the CPU 60.

The lens driving control section 80 controls motors and so forth not shown for driving the lenses of the zoom lens 11 in accordance with a control signal from the CPU 60.

The memory card 1000 is, for example, a semiconductor memory removably inserted in a slot connected to the reader/writer 50.

Operation of the image pickup apparatus 100 is described below.

In a standby state for image pickup, an image signal picked up by the camera block 10 is outputted to the LCD unit 40 through the camera signal processing section 20 and displayed as a camera-through image on the LCD unit 40 under the control of the CPU 60. On the other hand, if an instruction input signal for zooming from the inputting section 70 is inputted, then the CPU 60 outputs a control signal to the lens driving control section 80 so that a predetermined lens or lenses of the zoom lens 11 are moved under the control of the lens driving control section 80.

If a shutter not shown of the camera block 10 is rendered operative in accordance with an instruction input signal from the inputting section 70, then the picked up image signal is outputted from the camera signal processing section 20 to the image processing section 30, by which it is subjected to a compression coding process so that it is converted into digital data of a predetermined data format. The resulting data is outputted to the reader/writer 50 and written into the memory card 1000.

It is to be noted that focusing is carried out, for example, when the shutter release button of the inputting section 70 is half-depressed or fully depressed for recording or image pickup or in a like case, by the lens driving control section 80 moving a predetermined lens or lenses of the zoom lens 11 in accordance with a control signal from the CPU 60.

When image data recorded in the memory card 1000 is to be reproduced, predetermined image data is read out from the memory card 1000 by the reader/writer 50 in response to an operation of the inputting section 70 and is subjected to a decompression decoding process by the image processing section 30. Then, a reproduction image signal is outputted to the LCD unit 40, by which a reproduction image is displayed.

It is to be noted that, while, in the form of the image pickup apparatus described above, it is applied to a digital still camera, the range of application of the image pickup apparatus is not limited to a digital still camera, but the image pickup apparatus can be applied widely as a camera section or the like to digital inputting and/or outputting apparatus such as a digital video camera, a portable telephone set in which a camera is incorporated and a PDA (Personal Digital Assistant) in which a camera is incorporated.

The shapes and the numerical values of the components of the embodiments described hereinabove are mere examples embodying the present invention, and the technical scope of the present invention shall not be interpreted restrictively by them.

The present application contains subject matter related to that disclosed in Japanese Priority Patent Application JP 2009-287977 filed in the Japan Patent Office on Dec. 18, 2009, the entire content of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. A zoom lens, comprising:
a first lens group having a positive refracting power;
a second lens group having a negative refracting power;
a third lens group having a positive refracting power;
a fourth lens group having a positive refracting power; and
a fifth lens group having a positive or negative refracting power;
said first, second, third, fourth and fifth lenses being disposed in order from the object side to the image side of said zoom lens;
said second lens group and said fourth lens group being moved in the direction of an optical axis upon zooming;
said first lens group having a position fixed in the direction of the optical axis upon zooming;
said first lens group including a front side lens having a negative refracting power, an optical member for bending an optical path and a rear side lens having a positive refracting power, disposed in order from the object side toward the image side;
said third lens group having a position fixed in the direction of the optical axis upon zooming;
said zoom lens further comprising an aperture disposed between said second lens group and said third lens group or between said third lens group and said fourth lens group;
said zoom lens satisfying the following conditional expressions (1), (2) and (3):

$$1.8 < F1/FW < 3.0 \quad (1)$$

$$2.0 < D1G/FW < 3.3 \quad (2)$$

$$2.0 < DIA11/DIA21 < 3.0 \quad (3)$$

where
F1: focal length of said first lens group
D1G: thickness of said first lens group on said optical axis
FW: focal length of said entire lens system at the wide angle end
DIA11: effective diameter of said lens surface on the most object side of said first lens at the wide angle end
DIA21: effective diameter of said lens surface on the most object side of said second lens at the wide angle end.

2. The zoom lens according to claim 1, wherein said zoom lens satisfies the following conditional expressions (4) and (5):

$$2.1 < |FG1/FW| < 3.3 \quad (4)$$

$$1.8 < |FRW/FW| < 2.4 \quad (5)$$

where
FG1: focal length of said front side lens of said first lens group
FRW: focal length from said rear side lens of said first lens group to said fifth lens group at the wide angle end.

3. The zoom lens according to claim 1, wherein said second lens group includes a negative lens and a cemented lens of a negative lens and a positive lens disposed in order from the object side toward the image side, and said fourth lens group includes a cemented lens of a positive lens and a negative lens disposed in order from the object side toward the image side;

said zoom lens satisfying the following conditional expression (6):

$$0.84 < |D4/D2| < 2.0 \quad (6)$$

where
D2: amount of movement of said second lens group upon zooming where the image pickup object is located at infinity
D4: amount of movement of said fourth lens group upon zooming where the image pickup object is located at infinity.

4. The zoom lens according to claim 1, wherein said zoom lens satisfies the following conditional expressions (7) and (8):

$$0.5 < |F2/FW| < 1.0 \quad (7)$$

$$2.0 < F4/FW < 3.0 \quad (8)$$

where
F2: focal length of said second lens group
F4: focal length of said fourth lens group.

5. The zoom lens according to claim 1, wherein said fifth lens group has a positive refracting power and is configured such that a negative lens, a first positive lens movable in a direction perpendicular to the optical axis to shift an image, and a second positive lens having at least one face formed as an aspheric face are disposed in order from the object side toward the image side;

said fifth lens group satisfying the following conditional expressions (9), (10) and (11):

$$0.15 < \beta 52 < 0.55 \quad (9)$$

$$0.6 < \beta 53 < 1.1 \quad (10)$$

$$-0.2 < FW/F5 < 0.2 \quad (11)$$

where
$\beta 52$: lateral magnification of said first positive lens at the wide angle end
$\beta 53$: lateral magnification of said second positive lens at the wide angle end
F5: focal length of said fifth lens group.

6. The zoom lens according to claim 5, wherein said first positive lens of said fifth lens group is formed from resin and has at least one face formed as an aspheric face.

7. An image pickup apparatus, comprising:
a zoom lens; and
an image pickup element for converting an optical image formed by said zoom lens into an electric signal;
said zoom lens including a first lens group having a positive refracting power, a second lens group having a negative refracting power, a third lens group having a positive refracting power, a fourth lens group having a positive refracting power, and a fifth lens group having a positive or negative refracting power;
said first, second, third, fourth and fifth lenses being disposed in order from the object side to the image side of said zoom lens;
said second lens group and said fourth lens group being moved in the direction of an optical axis upon zooming;
said first lens group having a position fixed in the direction of the optical axis upon zooming;
said first lens group including a front side lens having a negative refracting power, an optical member for bending an optical path and a rear side lens having a positive refracting power, disposed in order from the object side toward the image side;
said third lens group having a position fixed in the direction of the optical axis upon zooming;
said zoom lens further including an aperture disposed between said second lens group and said third lens group or between said third lens group and said fourth lens group;
said zoom lens satisfying the following conditional expressions (1), (2) and (3):

$$1.8 < F1/FW < 3.0 \quad (1)$$

$$2.0 < D1G/FW < 3.3 \quad (2)$$

$$2.0 < DIA11/DIA21 < 3.0 \quad (3)$$

where
F1: focal length of said first lens group
D1G: thickness of said first lens group on said optical axis
FW: focal length of said entire lens system at the wide angle end
DIA11: effective diameter of said lens surface on the most object side of said first lens at the wide angle end
DIA21: effective diameter of said lens surface on the most object side of said second lens at the wide angle end.

* * * * *